US008078489B1

(12) United States Patent
Marsten

(10) Patent No.: US 8,078,489 B1
(45) Date of Patent: Dec. 13, 2011

(54) PRODUCT CONFIGURATION MODELING AND OPTIMIZATION

(75) Inventor: Roy E. Marsten, Atlanta, GA (US)

(73) Assignee: Emcien, Inc., Atlanta, GA (US)

( * ) Notice: Subject to any disclaimer, the term of this patent is extended or adjusted under 35 U.S.C. 154(b) by 1458 days.

(21) Appl. No.: 10/764,958

(22) Filed: Jan. 26, 2004

Related U.S. Application Data

(60) Provisional application No. 60/442,487, filed on Jan. 24, 2003.

(51) Int. Cl.
*G06Q 10/00* (2006.01)

(52) U.S. Cl. ...................................... 705/7.25
(58) Field of Classification Search .................. 705/7.25
See application file for complete search history.

(56) References Cited

U.S. PATENT DOCUMENTS

| | | | | |
|---|---|---|---|---|
| 5,630,070 | A * | 5/1997 | Dietrich et al. | 395/208 |
| 7,039,602 | B1 * | 5/2006 | Kapadia et al. | 705/26 |
| 7,231,374 | B1 * | 6/2007 | Balasinski | 705/400 |
| 7,347,364 | B2 * | 3/2008 | Walker et al. | 235/381 |
| 7,386,832 | B2 * | 6/2008 | Brunner et al. | 717/104 |
| 2005/0149377 | A1 * | 7/2005 | Schierholt | 705/10 |

OTHER PUBLICATIONS

Eisenbeis, C; Temam, O; Wijshoff, H, Fast Enumeration of Solutions for Data Dependence Analysis and Data Locality Optimization, Aug. 1993, vol. 3, pp. 299-306.*
Mike Thurber, Open Road to Strategic Value, Jun. 1, 1999, Intelligent Enterprise.*
A.V. Aho, et al., Chapter 5, The Design and Analaysis of Computer Algorithms, 1975; pp. 172-179, Addison-Wesley Publishing Co., Reading, Mass.
M.L. Fisher, An Applications Oriented Guide to Lagrangian Relaxation, Interfaces, Mar.-Apr. 1985, pp. 10-21, vol. 15, Univ. of Pennsylvania, Philadelphia, PA.
A.M. Geoffrion, Lagrangean Relaxation for Integer Programming, Mathematical Programming, Study 2, 1974, pp. 82-114, North-Holland Publishing Co., Amsterdam.
M Held, et al., Validation of Subgradient Optimization, Mathematical Programming, vol. 6, Mathematical Programming, 1974, pp. 62-88, vol. 6, North-Holland Publishing Co., Ams.
E. Horowitz, et al., Chapter 6-Graphs, Fundamentals of Data Structures, 1976, pp. 282-301, Science Press, Inc., Potomac, Maryland.
Leon S. Lasdon, Chapter 4, Solution of Linear Programs, Optimization Theory for Large Systems, 1970, pp. 207-242, The Macmillan Company, New York, NYYork.

(Continued)

*Primary Examiner* — Johnna Loftis
*Assistant Examiner* — Brandi P Parker
(74) *Attorney, Agent, or Firm* — Smith Risley; Steven P. Wigmore

(57) ABSTRACT

A computerized system and related methods of identifying an optimum set of product configurations from a plurality of possible product configurations, wherein each product configuration has a plurality of features and each feature has a plurality of options, includes the steps of representing each of the possible product configurations as an ordered set or array of at least n-dimensions, each dimension of the array representing a predetermined one of the features, identifying a subset of valid product configurations, identifying which valid configurations are captured by other configurations through upgrades, conversions, or acceptance of different options, defining and solving an optimization model to identify the optimum set of valid product configurations based on a desired objective, such as to maximize profit, minimize cost, or maximizing coverage of customer demand, and then presenting the optimum set of valid product configurations that satisfy the desired objective.

25 Claims, 27 Drawing Sheets

OTHER PUBLICATIONS

G.L. Nenhauser, et al., General Algorithms, Integer and Combinatorial Optimization, 1988, pp. 349-367, John Wiley & Sons, Inc., New York, NY.

Jeremy F. Shapiro, Chapter 6, Mathematical Programming: Structures and Algorithms, 1979, pp. 176-191, John Wiley & Sons, Inc., New York, NY.

Robert J. Vanderbei, Chapter 5, Linear Programming: Foundations and Extensions, 1997, pp. 51-64, Kluwer Academic Publishers, Boston, Mass.

Wayne L. Winston, Chapter 23, Operations Research: Applications and Algorithms, 1994, pp. 1183-1200, Wadsworth Publishing Co., Belmont, CA.

* cited by examiner

| Index | Feature | Number of Options | Option names |
|---|---|---|---|
| 1 | Model | 6 options | Model 1<br>Model 2<br>Model 3<br>Model 4<br>Model 5<br>Model 6 |
| 2 | Front Axle | 2 options | 2 wheel drive<br>4 wheel drive |
| 3 | Transmission | 3 options | SST<br>PRT<br>HST |
| 4 | ROPS - Roll over Protection system | 2 options | Fixed ROPS<br>Folding ROPS |
| 5 | PTO - Power Take off | 2 options | Less PTO<br>Mid PTO |
| 6 | SCV - System Control valve | 3 options | Less- SCV<br>Dual-SCV<br>Triple-SCV |
| 7 | Draft-links | 2 options | Less draft links<br>Flat bar draft links |
| 8 | Hitch | 2 options | None<br>Domestic hitch |
| 9 | Tires | 20 options | 2 wheel drive 4005<br>2 wheel drive 4015<br>2 wheel drive 4020<br>2 wheel drive 4030<br>4 wheel drive 4500<br>4 wheel drive 4505<br>4 wheel drive 4510<br>4 wheel drive 4515<br>4 wheel drive 4520<br>4 wheel drive 4525<br>4 wheel drive 4535<br>4 wheel drive 4540<br>4 wheel drive 4545<br>4 wheel drive 4550<br>4 wheel drive 4555<br>4 wheel drive 4556<br>4 wheel drive 4560<br>4 wheel drive 4565<br>4 wheel drive 4570<br>4 wheel drive 4575 |

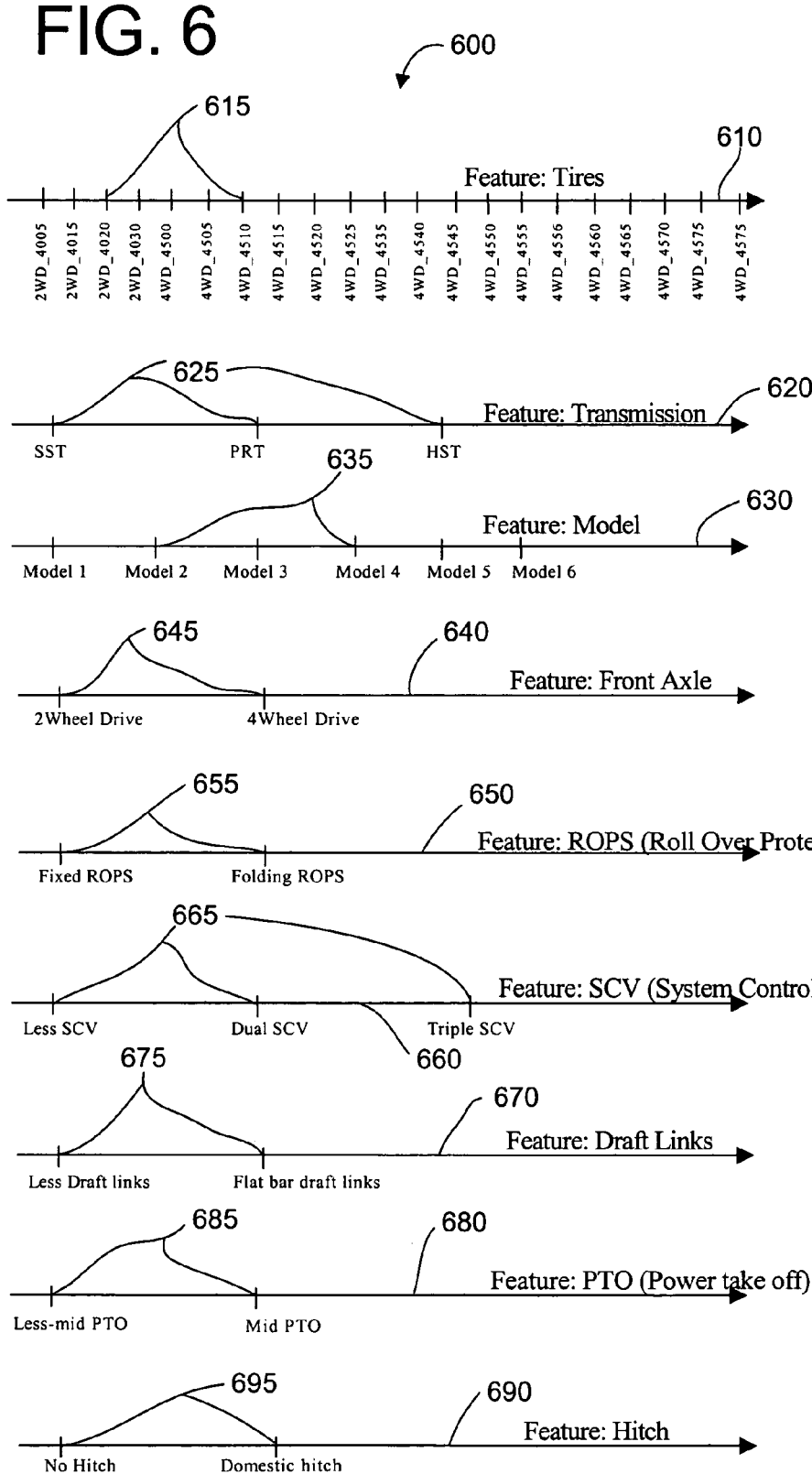

FIG. 9

| Index | Feature 1 | Option 1 | Relationship | Feature 2 | Option 2 | Translation |
|---|---|---|---|---|---|---|
| 1 | A | x | NE | B | y | If feature A is at option level x, then feature B cannot be at option level y |
| 2 | A | x | EQ | B | y | If feature A is at option level x, then feature B must be at option level y |
| 3 | A | x | EE | B | y | Feature A can be at option level x, if and only if feature B is at option level y |
| 4 | A | x | OR | B | y | If feature A is at option level x, them feature B must be at option level y or z |
| | A | x | OR | B | z | |

FIG. 10a

| Model | Model_3 | EQ | Front_Axle | 4WD |
|---|---|---|---|---|
| Model | Model_6 | EQ | Front_Axle | 4WD |
| Model | Model_1 | OR | Transmission | SST |
| Model | Model_1 | OR | Transmission | HST |
| Model | Model_3 | OR | Transmission | PRT |
| Model | Model_3 | OR | Transmission | HST |
| Model | Model_4 | OR | Transmission | SST |
| Model | Model_4 | OR | Transmission | PRT |
| Model | Model_6 | OR | Transmission | PRT |
| Model | Model_6 | OR | Transmission | HST |
| Model | Model_4 | NE | PTO | Mid_PTO |
| Model | Model_5 | NE | PTO | Mid_PTO |
| Model | Model_6 | NE | PTO | Mid_PTO |
| Tires | 2WD_4005 | EQ | Model | Model_1 |
| Tires | 2WD_4015 | OR | Model | Model_1 |
| Tires | 2WD_4015 | OR | Model | Model_2 |
| Tires | 2WD_4020 | EQ | Model | Model_2 |
| Tires | 2WD_4030 | EQ | Model | Model_4 |
| Tires | 4WD_4500 | EQ | Model | Model_1 |
| Tires | 4WD_4505 | OR | Model | Model_1 |
| Tires | 4WD_4510 | OR | Model | Model_1 |
| Tires | 4WD_4515 | OR | Model | Model_2 |
| Tires | 4WD_4520 | OR | Model | Model_2 |
| Tires | 4WD_4520 | OR | Model | Model_3 |
| Tires | 4WD_4525 | OR | Model | Model_1 |

FIG. 10b 1000

| Tires | 4WD_4525 | OR | Model | Model_2 |
|---|---|---|---|---|
| Tires | 4WD_4525 | OR | Model | Model_3 |
| Tires | 4WD_4535 | OR | Model | Model_2 |
| Tires | 4WD_4535 | OR | Model | Model_3 |
| Tires | 4WD_4540 | OR | Model | Model_4 |
| Tires | 4WD_4540 | OR | Model | Model_5 |
| Tires | 4WD_4540 | OR | Model | Model_6 |
| Tires | 4WD_4545 | OR | Model | Model_4 |
| Tires | 4WD_4550 | OR | Model | Model_5 |
| Tires | 4WD_4550 | OR | Model | Model_6 |
| Tires | 4WD_4555 | OR | Model | Model_4 |
| Tires | 4WD_4555 | OR | Model | Model_5 |
| Tires | 4WD_4556 | OR | Model | Model_6 |
| Tires | 4WD_4560 | OR | Model | Model_4 |
| Tires | 4WD_4560 | OR | Model | Model_5 |
| Tires | 4WD_4560 | OR | Model | Model_6 |
| Tires | 4WD_4565 | OR | Model | Model_4 |
| Tires | 4WD_4565 | OR | Model | Model_5 |
| Tires | 4WD_4565 | OR | Model | Model_6 |
| Tires | 4WD_4570 | OR | Model | Model_1 |
| Tires | 4WD_4570 | OR | Model | Model_2 |
| Tires | 4WD_4570 | OR | Model | Model_3 |
| Tires | 4WD_4575 | OR | Model | Model_2 |
| Tires | 4WD_4575 | OR | Model | Model_3 |
| Tires | 2WD_4005 | EQ | Front_Axle | 2WD |
| Tires | 2WD_4015 | EQ | Front_Axle | 2WD |
| Tires | 2WD_4020 | EQ | Front_Axle | 2WD |
| Tires | 2WD_4030 | EQ | Front_Axle | 2WD |
| Tires | 4WD_4500 | EQ | Front_Axle | 4WD |
| Tires | 4WD_4505 | EQ | Front_Axle | 4WD |
| Tires | 4WD_4510 | EQ | Front_Axle | 4WD |
| Tires | 4WD_4515 | EQ | Front_Axle | 4WD |
| Tires | 4WD_4520 | EQ | Front_Axle | 4WD |
| Tires | 4WD_4525 | EQ | Front_Axle | 4WD |
| Tires | 4WD_4535 | EQ | Front_Axle | 4WD |
| Tires | 4WD_4540 | EQ | Front_Axle | 4WD |
| Tires | 4WD_4545 | EQ | Front_Axle | 4WD |
| Tires | 4WD_4550 | EQ | Front_Axle | 4WD |
| Tires | 4WD_4555 | EQ | Front_Axle | 4WD |
| Tires | 4WD_4556 | EQ | Front_Axle | 4WD |
| Tires | 4WD_4560 | EQ | Front_Axle | 4WD |
| Tires | 4WD_4565 | EQ | Front_Axle | 4WD |
| Tires | 4WD_4570 | EQ | Front_Axle | 4WD |
| Tires | 4WD_4575 | EQ | Front_Axle | 4WD |

FIG. 11  1100

| Rule Name | Feature 1 | Feature 2 | Yes/No |
|---|---|---|---|
| rule1 | Model | Model_1 | yes |
| | Front_Axle | 2WD | yes |
| | Transmission | SST | yes |
| | PTO | Mid_PTO | yes |
| rule2 | Model | Model_2 | yes |
| | Front_Axle | 2WD | yes |
| | Transmission | SST | yes |
| | PTO | Mid_PTO | yes |
| rule3 | Model | Model_4 | yes |
| | Transmission | SST | yes |
| | Front_Axle | 4WD | yes |
| rule4 | Model | Model_4 | yes |
| | Transmission | PRT | yes |
| | Front_Axle | 2WD | yes |
| rule5 | Model | Model_5 | yes |
| | Transmission | SST | yes |
| | Front_Axle | 4WD | yes |
| rule6 | Model | Model_5 | yes |
| | Transmission | PRT | yes |
| | Front_Axle | 2WD | yes |
| rule7 | Model | Model_5 | yes |
| | Transmission | HST | yes |
| | Front_Axle | 2WD | yes |
| rule8 | Model | Model_2 | yes |
| | Transmission | PRT | yes |
| | Front_Axle | 2WD | yes |

V = All Valid Configurations
P = All candidate patterns
C = All Customer ordered configurations

FIG. 14 1400

| Part number | Quantity required |
|---|---|
| YZ18125 | 1 |
| LVA11680 | 1 |
| LVU12736 | 1 |
| M137828 | 2 |
| 14M7298 | 2 |
| 19M7867 | 2 |
| LVA11219 | 1 |
| LVA11349 | 1 |
| LVA11542 | 1 |
| LVA11543 | 1 |

| Part number | Unit cost |
|---|---|
| 14M7298 | 0.02 |
| 19M7867 | 0.05 |
| LVA11219 | 3.47 |
| LVA11349 | 4.52 |
| LVA11542 | 3.72 |
| LVA11543 | 2.90 |
| LVA11680 | 5.32 |
| LVU12736 | 6.52 |
| M137828 | 0.11 |
| YZ18125 | 2805.62 |

| Kit | Mask | Feature | Option | Y/N |
|---|---|---|---|---|
| KIT276 | 1 | Transmission | SST | Yes |
| KIT276 | 1 | Model | Model_1 | Yes |
| KIT276 | 1 | Front_Axle | 4WD | Yes |
| KIT276 | 1 | PTO | Mid_PTO | No |
| KIT276 | 2 | Transmission | SST | Yes |
| KIT276 | 2 | Model | Model_2 | Yes |
| KIT276 | 2 | Front_Axle | 4WD | Yes |
| KIT276 | 2 | PTO | Mid_PTO | No |

FIG. 17 

| Feature | Option | 1 | 2 | 3 | 4 | 5 | 6 |
|---|---|---|---|---|---|---|---|
| Model | Model_1 | 15169 | 0 | 0 | 0 | 0 | 0 |
| Model | Model_2 | 0 | 16339 | 0 | 0 | 0 | 0 |
| Model | Model_3 | 0 | 0 | 19359 | 0 | 0 | 0 |
| Model | Model_4 | 0 | 0 | 0 | 21279 | 0 | 0 |
| Model | Model_5 | 0 | 0 | 0 | 0 | 22939 | 0 |
| Model | Model_6 | 0 | 0 | 0 | 0 | 0 | 24709 |
| Front_Axle | 2WD | -1110 | -1110 | 0 | -1850 | -2235 | 0 |
| Front_Axle | 4WD | 0 | 0 | 0 | 0 | 0 | 0 |
| Transmission | SST | 0 | 0 | 0 | -1200 | -1200 | 0 |
| Transmission | PRT | 0 | 1200 | 0 | 0 | 0 | 0 |
| Transmission | HST | 2400 | 2400 | 1200 | 0 | 1200 | 1200 |
| ROPS | Fixed | -170 | -170 | -170 | -170 | -170 | -170 |
| ROPS | Folding | 0 | 0 | 0 | 0 | 0 | 0 |
| PTO | Mid_PTO | 390 | 390 | 390 | 0 | 0 | 0 |
| SCV | Dual | 700 | 700 | 700 | 700 | 700 | 700 |
| SCV | Triple | 950 | 950 | 950 | 950 | 950 | 950 |
| Draft_Links | Less | -700 | -700 | -700 | -630 | -630 | -630 |
| Draft_Links | Flat_Bar | 0 | 0 | 0 | 0 | 0 | 0 |
| Hitch | Domestic | 220 | 220 | 220 | 220 | 220 | 220 |
| Tires | 2WD_4005 | 90 | 0 | 0 | 0 | 0 | 0 |
| Tires | 2WD_4015 | 0 | -95 | 0 | 0 | 0 | 0 |
| Tires | 2WD_4020 | 0 | 15 | 0 | 0 | 0 | 0 |
| Tires | 2WD_4030 | 0 | 0 | 0 | -150 | 0 | 0 |
| Tires | 4WD_4500 | 0 | 0 | 0 | 0 | 0 | 0 |
| Tires | 4WD_4505 | 90 | 0 | 0 | 0 | 0 | 0 |
| Tires | 4WD_4510 | 210 | 0 | 0 | 0 | 0 | 0 |
| Tires | 4WD_4515 | 0 | 200 | 200 | 0 | 0 | 0 |
| Tires | 4WD_4520 | 0 | 400 | 400 | 0 | 0 | 0 |
| Tires | 4WD_4525 | 95 | 0 | 0 | 0 | 0 | 0 |
| Tires | 4WD_4535 | 0 | 220 | 220 | 0 | 0 | 0 |
| Tires | 4WD_4540 | 0 | 0 | 0 | 365 | 180 | 170 |
| Tires | 4WD_4545 | 0 | 0 | 0 | 0 | 0 | 0 |
| Tires | 4WD_4550 | 0 | 0 | 0 | 0 | 10 | 0 |
| Tires | 4WD_4555 | 0 | 0 | 0 | 185 | 0 | 0 |
| Tires | 4WD_4556 | 0 | 0 | 0 | 0 | 0 | 128 |
| Tires | 4WD_4560 | 0 | 0 | 0 | 595 | 410 | 400 |
| Tires | 4WD_4565 | 0 | 0 | 0 | 1610 | 1425 | 1415 |
| Tires | 4WD_4570 | 1295 | 1200 | 1200 | 0 | 0 | 0 |
| Tires | 4WD_4575 | 0 | 450 | 450 | 0 | 0 | 0 |

FIG. 18

| Model | Model_1 | 0.1391 |
|---|---|---|
| Model | Model_2 | 0.3325 |
| Model | Model_3 | 0.2034 |
| Model | Model_4 | 0.0855 |
| Model | Model_5 | 0.1034 |
| Model | Model_6 | 0.1361 |

FIG. 19

| Feature | Option | Model | | | | | |
| | | 1 | 2 | 3 | 4 | 5 | 6 |
|---|---|---|---|---|---|---|---|
| Front_Axle | 2WD | 0.0500 | 0.0370 | 0.0000 | 0.0520 | 0.0180 | 0.0000 |
| Front_Axle | 4WD | 0.9500 | 0.9630 | 1.0000 | 0.9480 | 0.9820 | 1.0000 |
| Transmission | SST | 0.2060 | 0.0870 | 0.0000 | 0.0520 | 0.0180 | 0.0000 |
| Transmission | PRT | 0.0000 | 0.2460 | 0.1860 | 0.9480 | 0.4510 | 0.4270 |
| Transmission | HST | 0.7940 | 0.6670 | 0.8140 | 0.0000 | 0.5310 | 0.5730 |
| ROPS | Fixed | 0.3210 | 0.2270 | 0.1810 | 0.1600 | 0.1360 | 0.0820 |
| ROPS | Folding | 0.6790 | 0.7730 | 0.8190 | 0.8400 | 0.8640 | 0.9180 |
| PTO | Less_PTO | 0.5130 | 0.7340 | 0.5860 | 1.0000 | 1.0000 | 1.0000 |
| PTO | Mid_PTO | 0.4870 | 0.2660 | 0.4140 | 0.0000 | 0.0000 | 0.0000 |
| SCV | Less_SCV | 0.0660 | 0.0610 | 0.0180 | 0.0450 | 0.0180 | 0.0160 |
| SCV | Dual_SCV | 0.8450 | 0.8360 | 0.8590 | 0.8930 | 0.8320 | 0.8130 |
| SCV | Triple_SCV | 0.0890 | 0.1030 | 0.1230 | 0.0620 | 0.1500 | 0.1710 |
| Draft_Links | Less_Draft | 0.0020 | 0.0040 | 0.0040 | 0.0370 | 0.0130 | 0.0297 |
| Draft_Links | Flat_Bar | 0.9980 | 0.9960 | 0.9960 | 0.9630 | 0.9870 | 0.9703 |
| Hitch | Domestic | 0.0240 | 0.0500 | 0.0600 | 0.0450 | 0.0270 | 0.0570 |
| Tires | 2WD_4005 | 0.0420 | 0.0000 | 0.0000 | 0.0000 | 0.0000 | 0.0000 |
| Tires | 2WD_4015 | 0.0080 | 0.0260 | 0.0000 | 0.0000 | 0.0000 | 0.0000 |
| Tires | 2WD_4020 | 0.0000 | 0.0150 | 0.0000 | 0.0000 | 0.0000 | 0.0000 |
| Tires | 2WD_4030 | 0.0000 | 0.0000 | 0.0000 | 0.0518 | 0.0323 | 0.0000 |
| Tires | 4WD_4500 | 0.0260 | 0.0000 | 0.0000 | 0.0000 | 0.0000 | 0.0000 |
| Tires | 4WD_4505 | 0.3570 | 0.0000 | 0.0000 | 0.0000 | 0.0000 | 0.0000 |
| Tires | 4WD_4510 | 0.4840 | 0.0000 | 0.0000 | 0.0000 | 0.0000 | 0.0000 |
| Tires | 4WD_4515 | 0.0000 | 0.6030 | 0.5840 | 0.0000 | 0.0000 | 0.0000 |
| Tires | 4WD_4520 | 0.0000 | 0.1550 | 0.2560 | 0.0000 | 0.0000 | 0.0000 |
| Tires | 4WD_4525 | 0.0800 | 0.0600 | 0.0370 | 0.0000 | 0.0000 | 0.0000 |
| Tires | 4WD_4535 | 0.0000 | 0.1090 | 0.0740 | 0.0000 | 0.0000 | 0.0000 |
| Tires | 4WD_4540 | 0.0000 | 0.0000 | 0.0000 | 0.0755 | 0.1885 | 0.1533 |
| Tires | 4WD_4545 | 0.0000 | 0.0000 | 0.0000 | 0.1238 | 0.0000 | 0.0000 |
| Tires | 4WD_4550 | 0.0000 | 0.0000 | 0.0000 | 0.0000 | 0.0865 | 0.0853 |
| Tires | 4WD_4555 | 0.0000 | 0.0000 | 0.0000 | 0.1445 | 0.1113 | 0.0000 |
| Tires | 4WD_4556 | 0.0000 | 0.0000 | 0.0000 | 0.0000 | 0.0000 | 0.1023 |
| Tires | 4WD_4560 | 0.0000 | 0.0000 | 0.0000 | 0.6028 | 0.5680 | 0.6260 |
| Tires | 4WD_4565 | 0.0000 | 0.0000 | 0.0000 | 0.0018 | 0.0135 | 0.0333 |
| Tires | 4WD_4570 | 0.0030 | 0.0030 | 0.0160 | 0.0000 | 0.0000 | 0.0000 |
| Tires | 4WD_4575 | 0.0000 | 0.0290 | 0.0330 | 0.0000 | 0.0000 | 0.0000 |

Key for each set of two rows of data: — 2005
▲demand,revenue,cost,
▲(Model,Front_Axle,Transmission,ROPS,PTO,SCV,Draft_Links,Hitch,Tires)

2010
{
948, $17,675 , $10,151 ,
(Model_2,4WD,HST,Folding,Less_PTO,Dual_SCV ,Flat_Bar ,None ,4WD_4515)

581, $19,313 , $10,238 ,
(Model_3,4WD,HST,Folding,Less_PTO,Dual_SCV ,Flat_Bar ,None ,4WD_4515)

554, $20,317 , $11,665 ,
(Model_4,4WD,PRT,Folding,Less_PTO,Dual_SCV ,Flat_Bar ,None ,4WD_4560)

482, $24,308 , $11,907 ,
(Model_6,4WD,HST,Folding,Less_PTO,Dual_SCV ,Flat_Bar ,None ,4WD_4560)

377, $23,228 , $11,872 ,
(Model_6,4WD,PRT,Folding,Less_PTO,Dual_SCV ,Flat_Bar ,None ,4WD_4560)

369, $19,664 , $10,425 ,
(Model_3,4WD,HST,Folding,Mid_PTO ,Dual_SCV ,Flat_Bar ,None ,4WD_4515)
}

•
•
•
} 2020

2030
{
1, $18,098 , $10,331 ,
(Model_3,4WD,PRT,Fixed ,Less_PTO,Dual_SCV ,Flat_Bar ,None ,4WD_4535)

1, $15,110 , $ 9,286 ,
(Model_2,4WD,SST,Folding,Less_PTO,Less_SCV ,Flat_Bar ,None ,4WD_4575)

1, $19,331 , $10,252 ,
(Model_3,4WD,PRT,Folding,Less_PTO,Dual_SCV ,Flat_Bar ,Domestic,4WD_4570)

1, $17,621 , $ 9,678 ,
(Model_2,4WD,HST,Folding,Mid_PTO ,Less_SCV ,Flat_Bar ,None ,4WD_4575)

1, $15,911 , $10,387 ,
(Model_2,4WD,SST,Folding,Mid_PTO ,Triple_SCV,Flat_Bar ,None ,4WD_4525)
}

FIG. 21 — 2100

| UPGRADE | Less_SCV | Dual_SCV | Triple_SCV |
|---|---|---|---|
| Less_SCV | 1 | 0 | 0 |
| Dual_SCV | 1 | 1 | 0 |
| Triple_SCV | 1 | 1 | 1 |

FIG. 22 — 2200

| UPGRADE | SST | PRT | HST |
|---|---|---|---|
| SST | 1 | 0 | 0 |
| PRT | 0 | 1 | 0 |
| HST | 0 | 0 | 1 |

FIG. 23 — 2300

| CONVERT | SST | PRT | HST |
|---|---|---|---|
| SST | 1 | 0 | 0 |
| PRT | 0 | 1 | 0 |
| HST | 0 | 0 | 1 |

FIG. 24 — 2400

| CONVERT cost | SST | PRT | HST |
|---|---|---|---|
| SST | 0 | INF | INF |
| PRT | INF | 0 | INF |
| HST | INF | INF | 0 |

FIG. 25 — 2500

| ACCEPT probability | SST | PRT | HST |
|---|---|---|---|
| SST | 1 | 0 - (2504) | 0 |
| PRT | 0.4 - (2502) | 1 | 0.2 |
| HST | 0 | 0.2 | 1 |

FIG. 26  2600

| UPGRADE | Less_PTO | Mid_PTO |
|---|---|---|
| Less_PTO | 1 | 0 |
| Mid_PTO | 1 | 1 |

FIG. 27  2700

| UPGRADE | Less_Draft_Links | Flat_Bar_Draft_Links |
|---|---|---|
| Less_Draft_Links | 1 | 0 |
| Flat_Bar_Draft_Links | 1 | 1 |

FIG. 28  2800

| ACCEPT probability | 2WD | 4WD |
|---|---|---|
| 2WD | 1 | 0.2 |
| 4WD | 0.5 | 1 |

FIG. 29  2900

| ACCEPT probability | Fixed_ROPS | Folding_ROPS |
|---|---|---|
| Fixed_ROPS | 1 | 0.5 |
| Folding_ROPS | 0.95 | 1 |

FIG. 30  3000

| ACCEPT probability | Less_PTO | Mid_PTO |
|---|---|---|
| Less_PTO | 1 | 0.5 |
| Mid_PTO | 0.5 | 1 |

FIG. 31  3100

| ACCEPT probability | Less_SCV | Dual_SCV | Triple_SCV |
|---|---|---|---|
| Less_SCV | 1 | 0.375 | 0 |
| Dual_SCv | 0.25 | 1 | 0.85 |
| Triple_SCV | 0.25 | 0.375 | 1 |

FIG. 32 3200

| ACCEPT probability | Less_Draft_Links | Flat_Bar_Draft_Links |
|---|---|---|
| Less_Draft_Links | 1 | 0 |
| Flat_Bar_Draft_Links | 0.95 | 1 |

FIG. 33 3300

| ACCEPT probability | None | Domestic_Hitch |
|---|---|---|
| None | 1 | 0.8 |
| Domestic_Hitch | 0.5 | 1 |

FIG. 35 3500 d(i) = the demand for configuration i in units, where i is in C.

convert(i,j) = cost of converting from pattern j to configuration i,
where i is in C and j is in COMPETE(i).

prob(i,j) = probability that a customer who wants configuration i will accept pattern j, where i is in C and j is in COMPETE(i).

c(i,j) = cost per unit if configuration i is assigned to pattern j, where i is in C and j is in COMPETE(i).

r(i,j) = revenue per unit if configuration i is assigned to pattern j, where i is in C and j is in COMPETE(i).

x(i,j) =  1 if configuration i is assigned to pattern j in the solution;
0 otherwise,
where i is in C, and j is in COMPETE(i).

y(j) =  1 if pattern j is chosen as a winner in the solution;
0 otherwise,
where j is in P.

FIG. 36

MODEL (P1)

Maximize the Objective Function Over x and y:

$$\sum_{i \in C} \sum_{j \in COMPETE(i)} d(i) * (r(i,j) - c(i,j)) * x(i,j) \quad \leftarrow 3605$$

Subject to:

Constraint Set 1:

$$\sum_{j \in COMPETE(i)} x(i,j) \leq 1 \quad \leftarrow 3610$$

For i in C,

Constraint Set 2:

$$x(i,j) \leq y(j) \quad \leftarrow 3620$$

For i in C, j in COMPLETE(i)

Constraint Set 3:

$$\sum_{j \in P} y(j) \leq r \quad \leftarrow 3630$$

FIG. 37

MODEL (P2)

Maximize the Objective Function Over x and y: 3705

$$\sum_{i \in C} \sum_{j \in COMPETE(i)} d(i) * (r(i,j) - c(i,j)) * x(i,j) - G * (r-1)$$

Subject to:

Constraint Set 1:

$$\sum_{j \in COMPETE(i)} x(i,j) \leq 1 \quad \text{3710}$$

For i in C,

Constraint Set 2:

$$x(i,j) \leq y(j) \quad \text{3720}$$

For i in C, j in COMPLETE(i)

Constraint Set 3:

$$\sum_{j \in P} y(j) - r = 0 \quad \text{3730}$$

FIG. 38

MODEL (LP2)

Maximize the Objective Function Over x, y and r: — 3805

$$\sum_{i \in C} \sum_{j \in COMPETE(i)} d(i) * (r(i,j) - c(i,j)) * x(i,j) - G * (r-1)$$

Subject to:

Constraint Set 1:

$$\sum_{j \in COMPETE(i)} x(i,j) \leq 1 \quad \text{— 3810}$$

For i in C,

Constraint Set 2:

$$x(i,j) \leq y(j) \quad \text{— 3820}$$

For i in C, j in COMPLETE(i)

Constraint Set 3:

$$\sum_{j \in P} y(j) = r \quad \text{— 3830}$$

Constraint Set 4:

$$0 \leq x(i,j) \leq 1 \quad \text{— 3840}$$

For i in C, j in COMPLETE(i)

Constraint Set 5:

$$0 \leq y(j) \leq 1 \quad \text{— 3850}$$

For j in P.

FIG. 39

Lagrangian Function

$$L(\pi) = \max(x,y,r) \sum_{i \in C} \sum_{j \in COMPETE(i)} d(i) * (r(i,j) - c(i,j)) * x(i,j)$$
$$- G * (r-1) + \sum_{i \in C} \pi(i) * (1 - \sum_{j \in COMPETE(i)} x(i,j)) \quad \text{— 3905}$$

Subject to:

Constraint Set 1:

$$x(i,j) \leq y(j) \quad \text{— 3910}$$

For i in C, j in COMPLETE(i)

Constraint Set 2:

$$\sum_{j \in P} y(j) - r = 0 \quad \text{— 3920}$$

Constraint Set 3:

$$0 \leq x(i,j) \leq 1 \quad \text{— 3930}$$

For i in C, j in COMPLETE(i)

Constraint Set 4:

$$0 \leq y(j) \leq 1 \quad \text{— 3940}$$

For j in P.

FIG. 40

Lagrangian Function - simplified $$L(\pi) = G + \sum_{i \in C} \pi(i) + \max(x, y, r)$$

$$\sum_{i \in C} \sum_{j \in COMPETE(i)} (d(i)*r(i,j) - d(i)*c(i,j) - \pi(i))*x(i,j)$$

← 4005

Subject to:

Constraint Set 1:

$$x(i,j) \leq y(j)$$ ← 4010

For i in C, j in COMPLETE(i)

Constraint Set 2:

$$\sum_{j \in P} y(j) - r = 0$$ ← 4020

Constraint Set 3:

$$0 \leq x(i,j) \leq 1$$ ← 4030

For i in C, j in COMPLETE(i)

Constraint Set 4:

$$0 \leq y(j) \leq 1$$ ← 4040

For j in P.

FIG. 41

MODEL (D2) 4100

$$\min(\pi \geq 0) L(\pi)$$

FIG. 42 4200

$$\sigma_j(\pi) = \sum_{i \in CAPTURE(j)} \max\{d(i)*r(i,j) - d(i)*c(i,j) - \pi(i), 0\}$$

FIG. 43 4300

$$P^* = \{j \in P \mid \sigma_j(\pi) >= G\}$$
$$r^* = number\_of\_elements(P^*)$$

FIG. 44 4400

$$L(\pi) = G + \sum_{i \in C} \pi(i) + \sum_{j \in P^*} \sigma_j(\pi) - G*r^*$$

FIG. 45 4500

$$\pi_i^{k+1} = \pi_i^k - \lambda^k * (1 - \sum_{j \in COMPETE(i)} x^*(i,j))$$
For all i in C

$$x^*(i,j) = 1 \quad \text{IF} \quad d(i)*r(i,j) - d(i)*c(i,j) - \pi(i) > 0$$

$$x^*(i,j) = 0 \quad \text{IF} \quad d(i)*r(i,j) - d(i)*c(i,j) - \pi(i) \leq 0$$

$$y^*(j) = 1 \quad \text{IF} \quad \sigma_j(\pi) \geq G$$

$$y^*(j) = 0 \quad \text{IF} \quad \sigma_j(\pi) < G$$

Step 0: Set t=0, and choose P(t) as a subset of V.

Step 1: Solve (P2(t)) to get a solution.

$$(x^t, y^t, \pi^t) \qquad \leftarrow 4710$$

4720

Step 2: Find a pattern k in (V - P) such that:

$$\sigma_k(\pi^t) = \sum_{i \in CAPTURE(k)} \max\{d(i)*r(i,k) - d(i)*c(i,k) - \pi^t(i), 0\} \geq G$$

If there is no such pattern k, then we are done.

Step 3: Set P(t+1) = P(t) + {k}. Set t=t+1. Go to step 1.

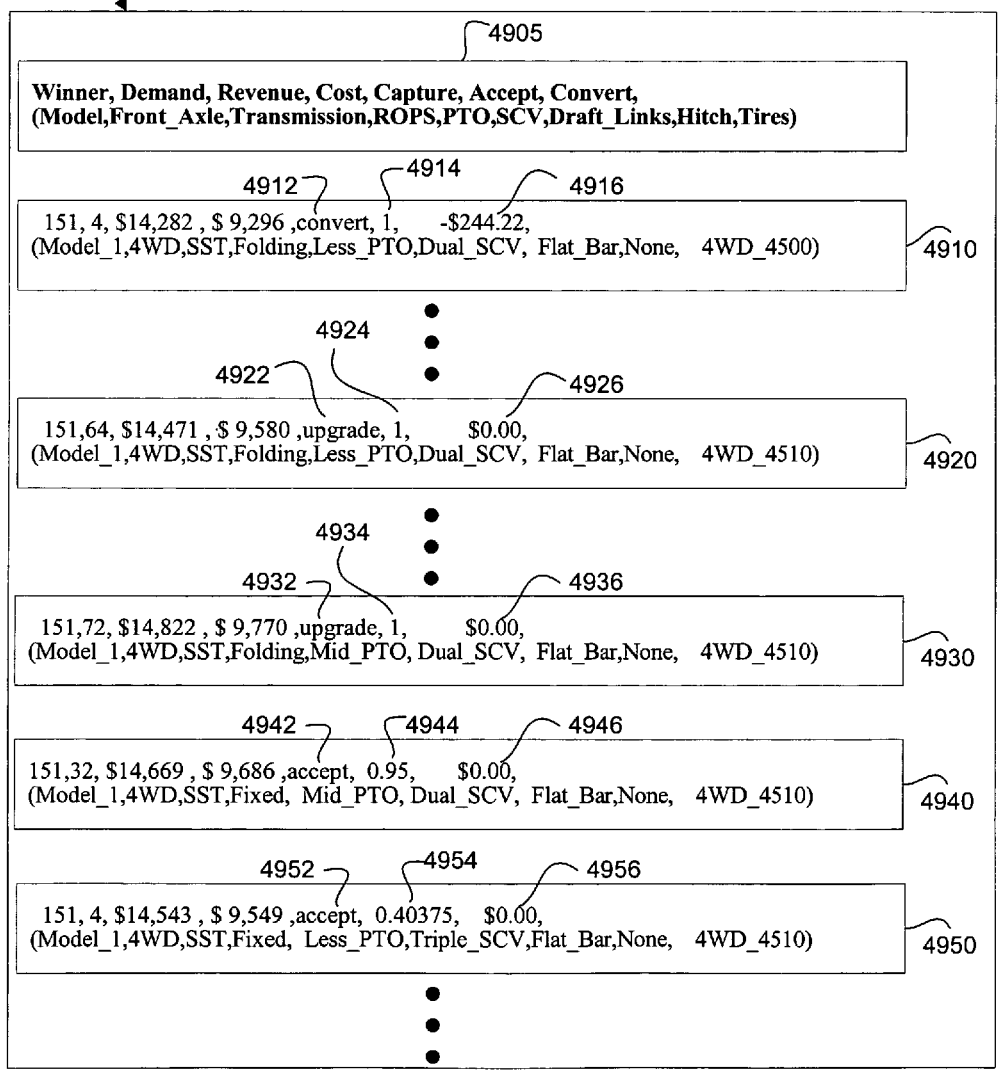

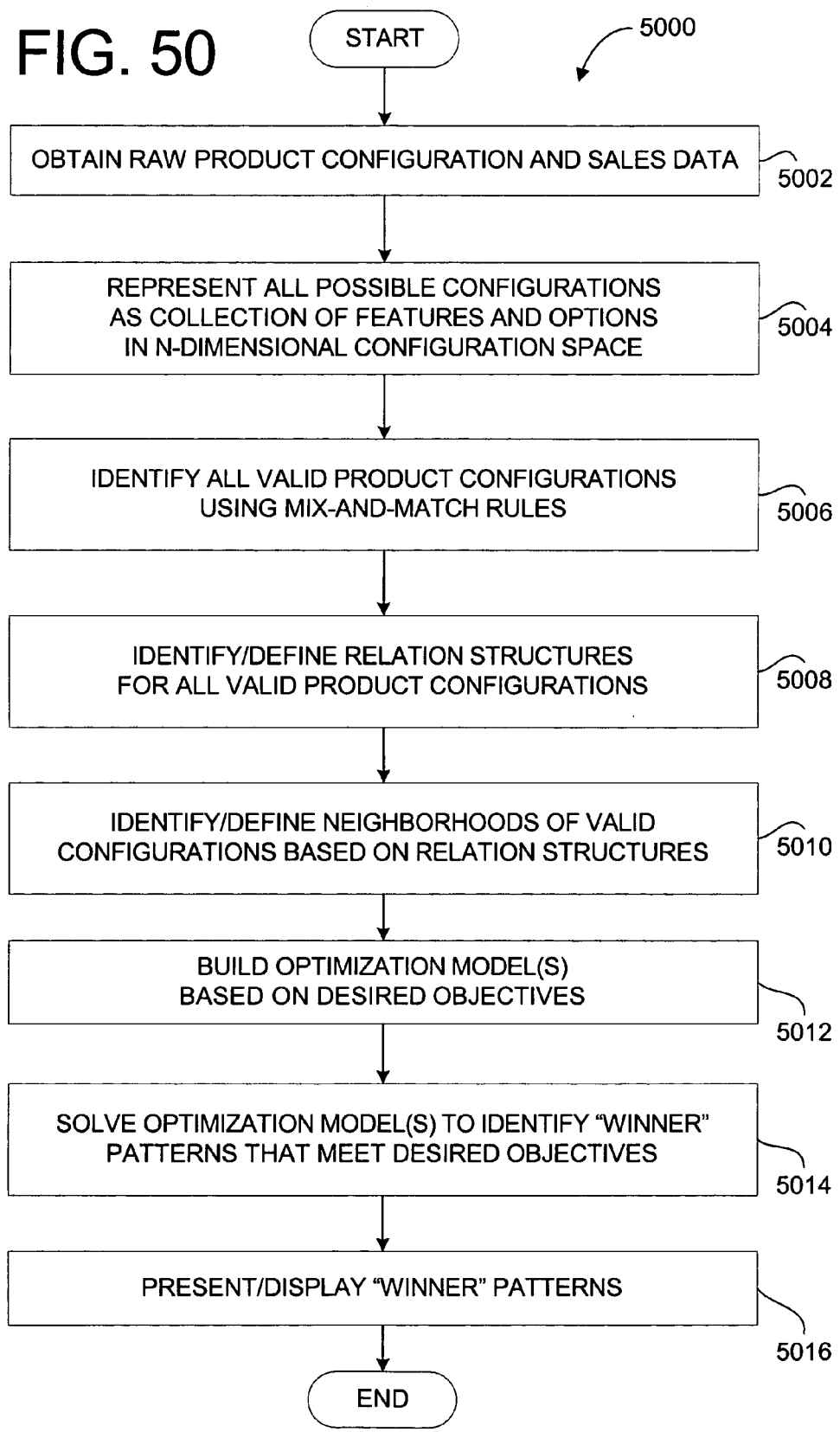

PRODUCT CONFIGURATION MODELING AND OPTIMIZATION

CROSS REFERENCE TO RELATED APPLICATION

This application claims the benefit under 35 U.S.C. §119(e) of U.S. provisional patent application No. 60/442,487, entitled "System and Method For Product Configuration Analysis and Optimization," filed Jan. 24, 2003, which is incorporated in its entirety herein by reference.

FIELD OF THE PRESENT INVENTION

The present invention relates generally to product and system optimization, and, more particularly, to methods and systems for modeling complex product configurations and for identifying optimum product configurations using mathematical models and algorithms to maximize profit, minimize cost, or maximize customer demand coverage associated with such product configurations.

BACKGROUND OF THE PRESENT INVENTION

There is an explosion of product offerings in the marketplace today. Many new products are introduced each year, and these products have more features and options than ever before. Even old familiar products get new features that make them more complex. Customers are given more choices, but this means that each product must be ordered and built in many different ways. This widening of product offerings comes with a cost that, because of competitive pressures, often cannot be passed on to the customer. Companies are now faced with a realization that they are providing additional variety without a commensurate increase in revenue. The challenge that these companies face is escalating cost, exploding product offerings, and lack of pricing power.

The following simple example illustrates how product configuration explosion can happen. Assume a small tractor has 9 customer features from which a customer can choose. Such features include model, axle, transmission, etc. Each separate feature itself has multiple options from which to choose. For example, assume there are 12 models, 2 types of axles, 4 types of transmissions, and so on. Multiplying the number of choices for each feature (assuming there are an average of four possible options for each features) reveals that there can be more than 250,000 possible tractor configurations. Assume further that the tractor manufacturer also offers financing options and service/warranty packages with each tractor. Assume that there are 5 finance options, with only certain options applying to certain models, and 8 warranty packages, which vary based on the details of the configuration chosen. Combining the 250,000 possible tractor configurations with 5 finance options and 8 warranty packages results in a further explosion to more than 10 million possible "product configurations" for that one product line. As used herein, a product configuration is an instance of the final end product that the customer sees and buys. As shown in the above example, this may include the warranties and services that are added to the physical end-item configuration to define the final offering. Thus, in this example, the tractor manufacturer now has the challenge of sifting through over 10 million possibilities to determine which set of configurations to manufacture and offer to its customers in order to maximize their profitability and best satisfy customer demand.

Although the above example is for tractors, it should be readily apparent that many other products, such as computers, software, automobiles, washers, dryers, restaurant menu items, retail shelf space, and the like, all have large numbers of possible configurations. The problem of product configurations is also true for many types of services, such as cell phone plans, health care plans, HMOs, pension plans, financial packages, mortgage plans, life insurance, mail and delivery services, and the like.

Whether a company offers a complex product or a portfolio of services, or a combination of both, the above example is indicative of the magnitude of the problem. Companies face the on-going challenge of picking the right set and the right number of configurations to offer—preferably, to satisfy the greatest customer demand while maximizing profitability.

The impact of the company's decision about what products or services to offer is felt across the entire enterprise with regard to cost, revenue potential, and customer satisfaction. More specifically, each final product configuration that is offered by a company has an impact on revenue due to how well it satisfies customer demand, and an impact on cost due to the resources and materials required to support it. As the number of product configurations grow, there is an exponential increase in the number of parts, component configurations, subassemblies, suppliers, inventory, work in process, and overhead. This results in increased cost that is sometimes referred to as "cost of complexity." Such cost of complexity is estimated to be 5 to 20 percent of the total cost of goods sold. At the highest levels, the proliferation of product configurations impact business processes such as planning, sourcing, manufacturing (make), delivery, and post-sale support and service.

From a planning perspective, the challenge in dealing with many product configurations starts with the planning and engineering groups. These groups are being given shorter planning cycles for bringing new products to market. More product configurations mean more design documents, more interactions to worry about, more testing, and more changes. As a result, the initial plans do not accurately reflect the impact of the product configurations across the entire organization. This often leads to engineering rework and expensive delays.

With regard to sourcing, every product configuration has a different bill of materials (BOM). This means that the parts required depend on the actual configurations that are going to be built. But current ERP (Enterprise Resource Planning) and MRP (Material Requirements Planning) systems use representative or standard (or "phantom") configurations to determine parts requirements. This results in procurement mistakes that lead to excess inventory of some parts and to insufficient stocking of other parts. Often, expedited delivery, at increased expense, is required to obtain parts that are not in stock.

With respect to manufacturing or make, increased numbers of configurations often lead to unrealistic estimates of capacity requirements, resulting in longer lead times, missed due dates, excess capacity buffers, and in some cases plant shut downs. The increased number of end product configurations also results in increased parts and component configurations, which often results in increased error and rework in the manufacturing process. The increased number of configurations further leads to more complex sequencing issues that travel all the way down to the level of the suppliers.

Where representative or standard configurations are used, companies must accommodate for the lack of planning based on actual configurations. To do this plant managers often stock additional parts inventory and work in process inventory. This results in a buildup of inventory at the parts and component level. Again, at a cost to the company.

With respect to delivery, there is the on-going challenge of matching the right configuration with the right customer. As the configurations grow, this typically results in increased inventory of finished goods and spoilage. The additional configurations also demand additional support services of marketing, sales, logistics, and after-sales support. In the services industry, as the number of product offerings grow, there is a growing cost burden due to training sales teams, marketing, and the delivery of the new products into the market. As the number of product configurations grow, the probability of matching the customer to the right product offering drops dramatically. This leads to enormous frustration and confusion on both the sales teams and the customer.

With regard to post-sales support and service, every company has to support its products after the sale has been made. As the number of configurations grows, the requirements for support services grow much faster. In the manufacturing segment, this translates into parts and service, while in the services segment it translates into large teams of customer service staff that must keep up with and provide support for every product configuration the company has sold.

Thus, it should not be surprising that a company's final set of product offerings is one of the strongest driving factors in determining its overall profitability. Further, the impact on costs of configuration "creep" is very high, and companies must periodically attempt to control it. The most typical approach companies take is to streamline configurations on the basis of low sales volume or low margins. Companies also streamline offerings by eliminating features and options. The problem with these approaches is that they typically sacrifice more market share than necessary. The result is reduced revenue and, invariably a company backlash of introducing even more product configurations in an attempt to gain market share.

Streamlining configurations across the enterprise is even further complicated because a complete solution needs to take into account customer demand, all valid product configurations, and economics of make and deliver for the product, component or service. (parts cost, non-parts cost and revenue). If the solution methodology fails to consider any one of these three elements while deriving the optimal set of product configurations, the solution will be incomplete and could cause a negative impact on the company's bottom line. Each of the three mentioned systems is complex in its own right. But, to derive the optimal set of configurations to maximize profitability, all three systems need to be considered simultaneously.

Currently, companies attempt to determine what product configurations to offer manually or with spreadsheets. While such approaches are satisfactory for addressing products with few configurations, manual calculations are of little benefit in identifying the "right" configurations to manufacture or offer when the number of configurations are orders of magnitude greater. Nevertheless, decisions must be made. Periodically, a product group will make a "best guess" as to what product configurations to offer. Because there is currently no known method to represent all the product configurations for a product line, determine the cost and profit of each configuration, and decide on the best choice, companies must rely upon best guesses, luck, and intuition.

Yet a further common practice among manufacturers of configurable products is to keep track of all of the different configurations they have built so far. When an order is received, it is compared to the history of all configurations that have been built in the past. If it does not match any of these historical configurations, it is assigned a new "version/configuration number." These version numbers are usually assigned sequentially, and each version number accumulates its own set of instances, usually in the form of a set of serial numbers. Each new serial number becomes an instance of some existing version, or else gets a new version number of its own. Thus, the complete set of units that have been built is partitioned into different versions, each of which represents a unique configuration. Typically, after some period of collecting history, there are a few versions with many instances, and a great many versions with only one or two instances.

Other manufacturers, however, do not keep track of versions. They keep a history, by serial number, of all units that have been built, but this history is never actually collapsed into unique versions. These manufacturers have no way of determining the configurations that have been built.

Another problem is the fact that the version number assigned to a product configuration is usually arbitrary. At best, the version number contains only a small amount of useable information about the relationship between configurations—usually, only as regards one or two features. Hence, most version numbers do not provide enough information to determined if two configurations are similar, or very different. A customer who wants configuration X might be satisfied with configuration Y, if configuration X and configuration Y are close enough in some appropriate sense. But closeness cannot be inferred from version numbers.

A crude way to measure the closeness or similarity of two configurations, X and Y, would be to count the number of features that match. In the tractor example: same model, same axle, everything else different, would give a measure of 2. But the meaning of this "2" is uncertain, since not all features are equally important.

Further, merely keeping track of all of the configurations that have been built to date ignores the far larger set of configurations that have never been built. These never-built configurations may be important missed opportunities. One never-built configuration Z may be close to many other configurations with only one or two instances. Building configuration Z, instead of all these unpopular versions, might satisfy the same customers and be far more profitable.

As the above examples illustrate, determining the optimal set of product offerings is a nontrivial task requiring sophisticated tools that can address this challenge on an ongoing basis. For these and many other reasons, there is a need for a system and method for streamlining product configurations across the enterprise taking into account customer demand, all valid product configurations, and economics of make and delivery for the product, component, or service.

There is a need for a system and methods for enabling a manufacturer or service provider to determine which product or service configurations should be manufactured.

There is yet a further need for a system and methods for enabling a manufacturer or service provider to determine how many of each configuration should be built.

There is also a need for a system and methods for enabling a manufacturer or service provider to determine which configurations are profitable or not profitable.

There is a need for a system and methods for enabling a manufacturer or service provider to determine the parts requirements necessary to build the right configurations.

There is a further need for a system and methods for enabling a manufacturer or service provider to determine how many of each part needs to be ordered and kept in stock.

There is a need for a system and methods for enabling a manufacturer or service provider to determine how to standardize product configurations and to determine what such standardized configurations will cost.

There is an additional need for a system and methods for enabling a manufacturer or service provider to determine how many valid configurations there are and how popular each one has been historically and how popular each one is likely to be in the future.

There is yet another need for a system and methods for enabling a manufacturer or service provider to determine when it is profitable to "give away" free upgrades on certain features, for example, to capture greater market share and/or to minimize cost of complexity.

There is a need for a system and methods for enabling a manufacturer or service provider to identify alternate configurations that may be of interest to a customer desiring a different configuration.

There is also a need for a system and methods for enabling a manufacturer or service provider to determine what small set of configurations are likely to satisfy the most customers.

Further, there is a need for a system and methods for enabling a manufacturer or service provider to identify relationships or similarities between various product configurations.

There is an overall need for a system and methods for enabling a manufacturer or service provider to keep track of all the product configurations they offer and to enable the selection of the "best configurations" to satisfy customer demand.

There is a need for a system and methods for enabling a manufacturer or service provider to represent product configurations as points in a multidimensional or n-dimensional space and for a system and methods of using rules to identify or define closeness of various product configurations in order to further define a "configuration space."

There is yet a further need for a system and methods for enabling a manufacturer or service provider to use mathematical models and algorithms to manipulate such a configuration space and, correspondingly, to answer questions, such as: (i) which 10 (or 20 or 100) configurations would capture the most customer demand? (ii) which 10 configurations would be the most profitable to offer? (iii) if there is an incremental cost of offering additional configurations, then what is the most profitable number to offer, and what configurations are they?

For these and many other reasons, there is a general need for a method of identifying an optimum set of product configurations from a plurality of possible product configurations within a computerized system is disclosed. Each product configuration has a plurality of selectable features and each selectable feature has a plurality of options. The method of this first aspect includes the steps of representing each of the plurality of possible product configurations as an ordered set of dimensions, each selectable feature being represented by one respective dimension of the ordered set, identifying a plurality of valid product configurations as a subset of the possible product configurations, defining configuration neighborhoods that identify at least one valid product configuration captured by another valid product configuration, defining an optimization model to identify the optimum set of valid product configurations based on a desired objective, solving the optimization model, and presenting the optimum set of valid product configurations that satisfy the desired objective.

For these and many other reasons, there is also a general need for a method of identifying an optimum set of product configurations within a computerized system includes the steps of receiving product configuration data representative of a plurality of possible product configurations capable of manufacture by a company, identifying a plurality of selectable features associated with the plurality of possible product configurations, identifying a plurality of options associated with each respective selectable feature, representing each of the plurality of possible product configurations as an ordered array of the selectable features, identifying a plurality of valid product configurations as a subset of the plurality of possible product configurations, defining an optimization model based on achieving a desired objective, solving the optimization model to identify the optimum set of valid product configurations that achieves the desired objective, and presenting the optimum set of valid product configurations to the company.

For these and many other reasons, there is a further general need for a computerized system for identifying an optimum set of product configurations includes a configuration generator for receiving product configuration data, the product configuration data representative of all possible product configurations, each product configuration defined by a plurality of features, each feature having a plurality of options, the configuration generator applying mix-and-match rule to identify a subset of valid product configurations, the configuration generator further representing each of the valid product configurations as an ordered array, a demand simulator for calculating relative demand for each of the valid product configurations, a cost calculator for calculating and associating a cost of manufacture for each of the valid product configurations, a revenue calculator for calculating and associating a revenue potential for each of the valid product configurations, an objective-based modeler for defining an optimization model and for receiving product configuration information from the configuration generator, the demand simulator, the cost calculator, and the revenue calculator, and an optimization engine for solving the optimization model and presenting the optimal set of product configurations and for presenting costs, revenue, and parts needed for the optimal set of product configurations.

The present invention meets one or more of the above-referenced needs as described herein in greater detail.

SUMMARY OF THE PRESENT INVENTION

The present invention relates generally to product and system optimization, and, more particularly, to methods and systems for modeling complex product configurations and for identifying optimum product configurations using mathematical models and algorithms to maximize profit, minimize cost, or maximize customer demand coverage associated with such product configurations. Briefly described, aspects of the present invention include the following.

In a first aspect of the present invention, a method of identifying an optimum set of product configurations from a plurality of possible product configurations within a computerized system is disclosed. Each product configuration has a plurality of selectable features and each selectable feature has a plurality of options. The method of this first aspect includes the steps of representing each of the plurality of possible product configurations as an ordered set of dimensions, each selectable feature being represented by one respective dimension of the ordered set, identifying a plurality of valid product configurations as a subset of the possible product configurations, defining configuration neighborhoods that identify at least one valid product configuration captured by another valid product configuration, defining an optimization model to identify the optimum set of valid product configurations based on a desired objective, solving the optimization model, and presenting the optimum set of valid product configurations that satisfy the desired objective.

The first aspect of the invention includes the step of associating a cost and a revenue to each valid product configuration. In some embodiments, the cost associated with each valid product configuration is comprised of a plurality of per option costs.

The first aspect further includes associating a demand to each valid product configuration. In some embodiments, the demand associated with each valid product configuration is based on the demand of each respective option of the valid product configuration.

In another feature of the first aspect of the invention, the desired objective is to maximize the profit of a manufacturer or retailer of the products, to minimize the costs of a manufacturer of the products, and/or to maximize coverage of customer demand. In other features, the optimization model is defined when the optimum set of product configurations is fixed. In other embodiments, the optimization model is defined when the optimum set of product configurations is variable.

In another feature of the first aspect of the invention, the dimensions of the ordered set represent the features in a fixed and non-modifiable order.

In yet another feature, the step of identifying the valid product configurations comprises the steps of applying mix-and-match rules to identify invalid or impermissible product configurations. In some embodiments, the step of identifying the valid product configurations further comprises the step of conducting fast enumeration on partial configurations.

In yet a further feature, the step of defining configuration neighborhoods comprises the step of defining a relation structure. In some embodiments, the relations structure is an upgrade relation that identifies at least one feature having an option that is upgradeable for no additional cost to a customer of the product configuration having the upgrade option. In other embodiments, the relation structure is a convert relation that identifies at least one feature having an option that is convertible to another option at a respective conversion cost. In other embodiments, the relation structure is an acceptance relation that identifies at least one feature having an option that is acceptable to a consumer desiring a different option at a respective acceptance value. Preferably, the acceptance value is a probability that the customer will accept the acceptance option instead of the different option. In other embodiments, the relation structure is an acceptance relation that identifies a plurality of features, each feature having a respective option that is acceptable to a consumer desiring respective different options at a respective acceptance value, the acceptance value being the product of the probabilities that the customer will accept each respective different option. In yet a further embodiment, the relation structure identifies at least one valid product configuration that captures another valid product configuration through an upgrade, conversion, or acceptance of at least one option.

In yet further features of the present aspect of the present invention, the product represents a manufactured good or a service.

In a second aspect of the present invention, a method of identifying an optimum set of product configurations within a computerized system includes the steps of receiving product configuration data representative of a plurality of possible product configurations capable of manufacture by a company, identifying a plurality of selectable features associated with the plurality of possible product configurations, identifying a plurality of options associated with each respective selectable feature, representing each of the plurality of possible product configurations as an ordered array of the selectable features, identifying a plurality of valid product configurations as a subset of the plurality of possible product configurations, defining an optimization model based on achieving a desired objective, solving the optimization model to identify the optimum set of valid product configurations that achieves the desired objective, and presenting the optimum set of valid product configurations to the company.

In a third aspect of the present invention, a computerized system for identifying an optimum set of product configurations includes a configuration generator for receiving product configuration data, the product configuration data representative of all possible product configurations, each product configuration defined by a plurality of features, each feature having a plurality of options, the configuration generator applying mix-and-match rule to identify a subset of valid product configurations, the configuration generator further representing each of the valid product configurations as an ordered array, a demand simulator for calculating relative demand for each of the valid product configurations, a cost calculator for calculating and associating a cost of manufacture for each of the valid product configurations, a revenue calculator for calculating and associating a revenue potential for each of the valid product configurations, an objective-based modeler for defining an optimization model and for receiving product configuration information from the configuration generator, the demand simulator, the cost calculator, and the revenue calculator, and an optimization engine for solving the optimization model and presenting the optimal set of product configurations and for presenting costs, revenue, and parts needed for the optimal set of product configurations.

The present invention also encompasses computer-readable medium having computer-executable instructions for performing methods of the present invention, and computer networks and other systems that implement the methods of the present invention.

For ease of reference, the present invention will be described herein primarily with respect to "product configurations." However, it should be understood that the present invention applies equally to products or services. Further, the present invention will be described primarily with respect to "product manufacturing." Again, it should be understood that the present invention is also applicable to determinations of what products or services to offer for sale, to distribute, to order, to stock, to use in a particular software application, component, system, and the like.

The above features as well as additional features and aspects of the present invention are disclosed herein and will become apparent from the following description of preferred embodiments of the present invention.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein:

FIG. 4 is a table showing a list of features and options associated with a specific product (tractor) example to illustrate one application of the present invention;

FIG. 6 is a 9-dimensional axis illustrating all nine features of the product example of FIG. 4;

FIG. 9 is a table illustrating an exemplary syntax for first order mix-and-match rules for use with the present invention;

FIGS. 10a and 10b is a table illustrating first order mix-and-match rules for use with the product example of FIG. 4;

FIG. 11 is a table illustrating higher order mix-and-match rules for use with the product example of FIG. 4;

FIG. 14 is a table illustrating a partial contents list of Kit # 276 for use with the product example of FIG. 4;

FIG. 15 is a table illustrating excerpts from a parts catalogue with per unit costs associated with parts for use with the product example of FIG. 4;

FIG. 16 is a table illustrating an applicability rule for the kit of FIG. 14 for use with the product example of FIG. 4;

FIG. 17 is a table illustrating a revenue structure for use with the product example of FIG. 4;

FIG. 18 is a table illustrating exemplary take rates for the model feature of the product example of FIG. 4;

FIG. 19 is a table illustrating exemplary take rates for the remaining eight features of the product example of FIG. 4;

FIG. 20 is a redacted table listing configurations in order by demand for the product example of FIG. 4 as determined using methods and systems of the present invention;

FIG. 21 is a table illustrating an exemplary upgrade relation for a feature of the product example of FIG. 4;

FIG. 22 is a table illustrating an exemplary upgrade relation for another feature of the product example of FIG. 4;

FIG. 23 is a table illustrating an exemplary convert relation for a feature of the product example of FIG. 4;

FIG. 24 is a table illustrating an exemplary convert cost for the feature of FIG. 23;

FIG. 25 is a table illustrating exemplary accept probabilities for a feature of the product example of FIG. 4;

FIG. 26 is a table illustrating an exemplary upgrade relation for yet another feature of the product example of FIG. 4;

FIG. 27 is a table illustrating an exemplary upgrade relation for yet a further feature of the product example of FIG. 4;

FIGS. 28-33 are tables illustrating exemplary accept probabilities for other features of the product example of FIG. 4;

FIG. 35 is a table illustrating the definitions of the model parameters used by the optimization models of the present invention;

FIG. 36 illustrates a first optimization model (for a fixed number of patterns) for use with the present invention;

FIG. 37 illustrates a second optimization model (for a variable number of patterns) for use with the present invention;

FIG. 38 illustrates a linear programming relation of the second optimization model for use with the present invention;

FIG. 39 illustrates a Lagrangian function for use with the present invention;

FIG. 40 illustrates a Lagrangian function, simplified, for use with the present invention;

FIG. 41 illustrates a Lagrangian dual problem for use with the present invention;

FIG. 42 illustrates a criterion number formula for use with the present invention;

FIG. 43 illustrates equations for identifying winning patterns for a given set of Lagrangian multipliers for use with the present invention;

FIG. 44 illustrates a formula for the current value of the Lagrangian function for use with the present invention;

FIG. 45 illustrates a subgradient optimization iteration for use with the present invention;

FIG. 46 illustrates a primal solution to the Lagrangian problem of the present invention;

FIG. 47 illustrates a pattern generation algorithm for use with the present invention;

FIG. 48 is a table illustrating an exemplary "winning pattern" identified by the present invention for the product example of FIG. 4;

FIG. 49 is a table illustrating an exemplary set of configurations captured by the "winning pattern" of FIG. 48;

FIG. 50 is a flowchart illustrating a preferred methodology of the present invention.

DETAILED DESCRIPTION OF PREFERRED EMBODIMENTS

Conventional Systems

Figure 1:
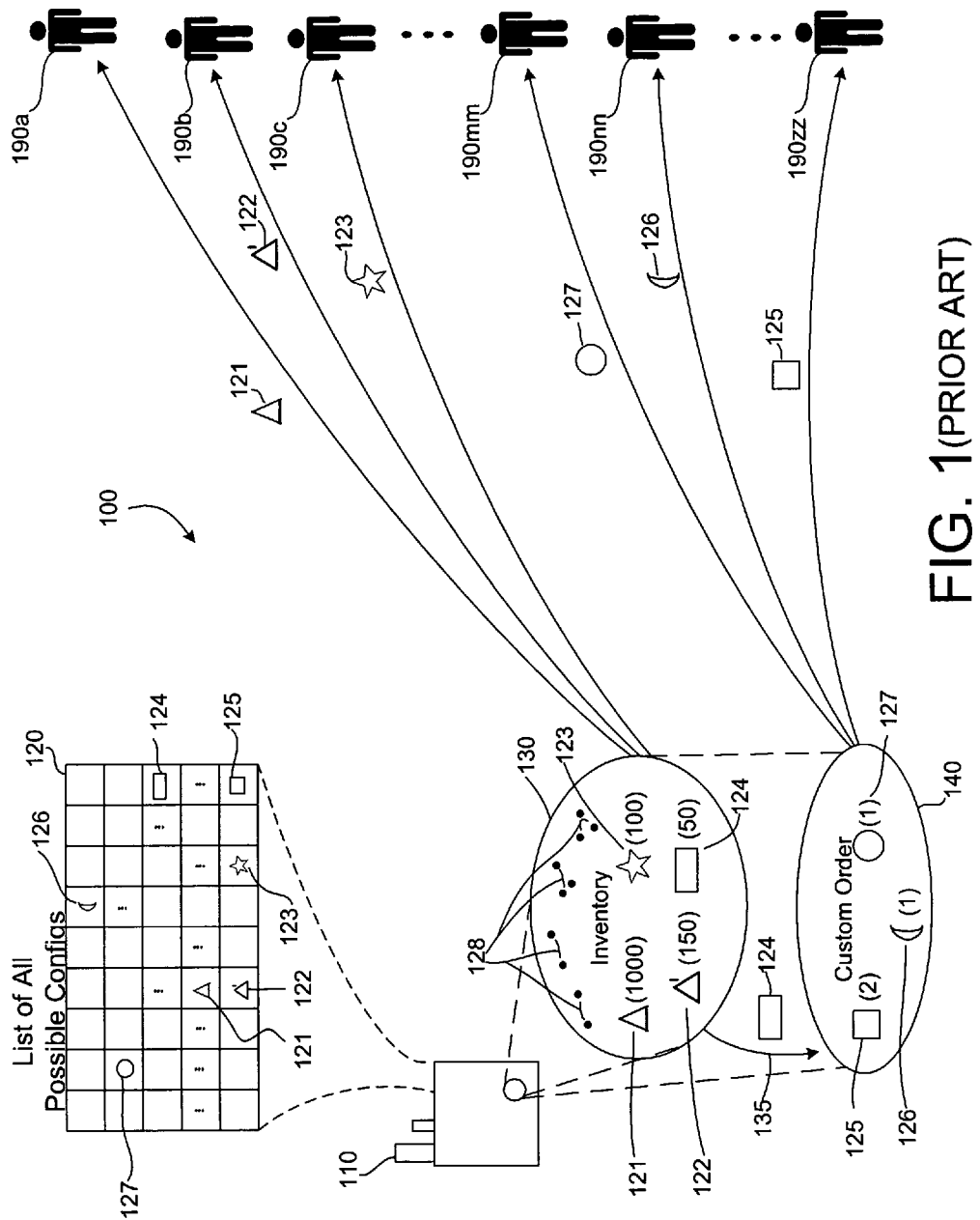
FIG. 1 is a system view of a conventional manufacturing-sales system.

Before turning to the detail description of the present invention, it will be helpful to understand how manufacturers currently maintain product configurations and address customer demand. FIG. 1 illustrates a conventional manufacturing-sales system 100 having a manufacturer 110 and a plurality of customers 190. Table 120, which is redacted for simplicity, illustrates the wide array of product configurations available from the manufacturer 110. Using the previous tractor example, the nine columns of the table 120 represent the nine possible customer-selectable features for tractors manufactured by the manufacturer 110. Each row represents one of the options for each of the nine features. If there are an average of four options for each of the nine features and if all possible combinations of features can be built by the manufacturer 110, then there are over 250,000 possible tractor configurations, each represented by one of the grids of the table 120. A number of exemplary, but specific and different product configurations 121, 122, 123, 124, 125, 126, 127 are shown in the table 120, such different product configurations each having their own respective geometric shape for identification purposes.

FIG. 1 further illustrates that the manufacturer 110 maintains some product configurations in inventory 130. In this example, the most-sold configurations 121, 122, 123, and 124 and a plurality of other possible configurations 128 are kept in inventory 130. The number in parenthesis indicates the demand or relative demand for each such configuration in number of units. FIG. 1 also illustrates the fact that the manufacturer 110 is able to respond to custom order requests 140.

In this example, the manufacturer 110 has a relative demand of two for configuration 125, one for configuration 126, and one for configuration 127. Arrow 135 illustrates the fact that the manufacturer 110 is able to take configuration 124 from inventory 130 and modify the same to create custom configuration 125 in order to meet demand. As shown, custom configurations 126, 127 are manufactured from scratch or essentially from scratch. Typically, the manufacturer 110 feels compelled to meet the demand for configurations 125, 126, 127 to maintain market share—notwithstanding the fact that meeting such demand likely imposes additional costs on the manufacturer with little-to-no, or even negative, profit margin. Thus, there is a cost and delay ion getting products to market for any custom-built configurations and, likewise, there is a cost for maintaining excess and unsold configurations in inventory 130. Finally, FIG. 1 illustrates the fact that customer 190a has demand for and buys configuration 121, customer 190b has demand for and buys configuration 122, customer 190c has demand for and buys configuration 123, customer 190mm has demand for and buys configuration 127, customer 190nn has demand for and buys configuration 126, and customer 190zz has demand for and buys configuration 125.

Optimization System Overview

Figure 2:
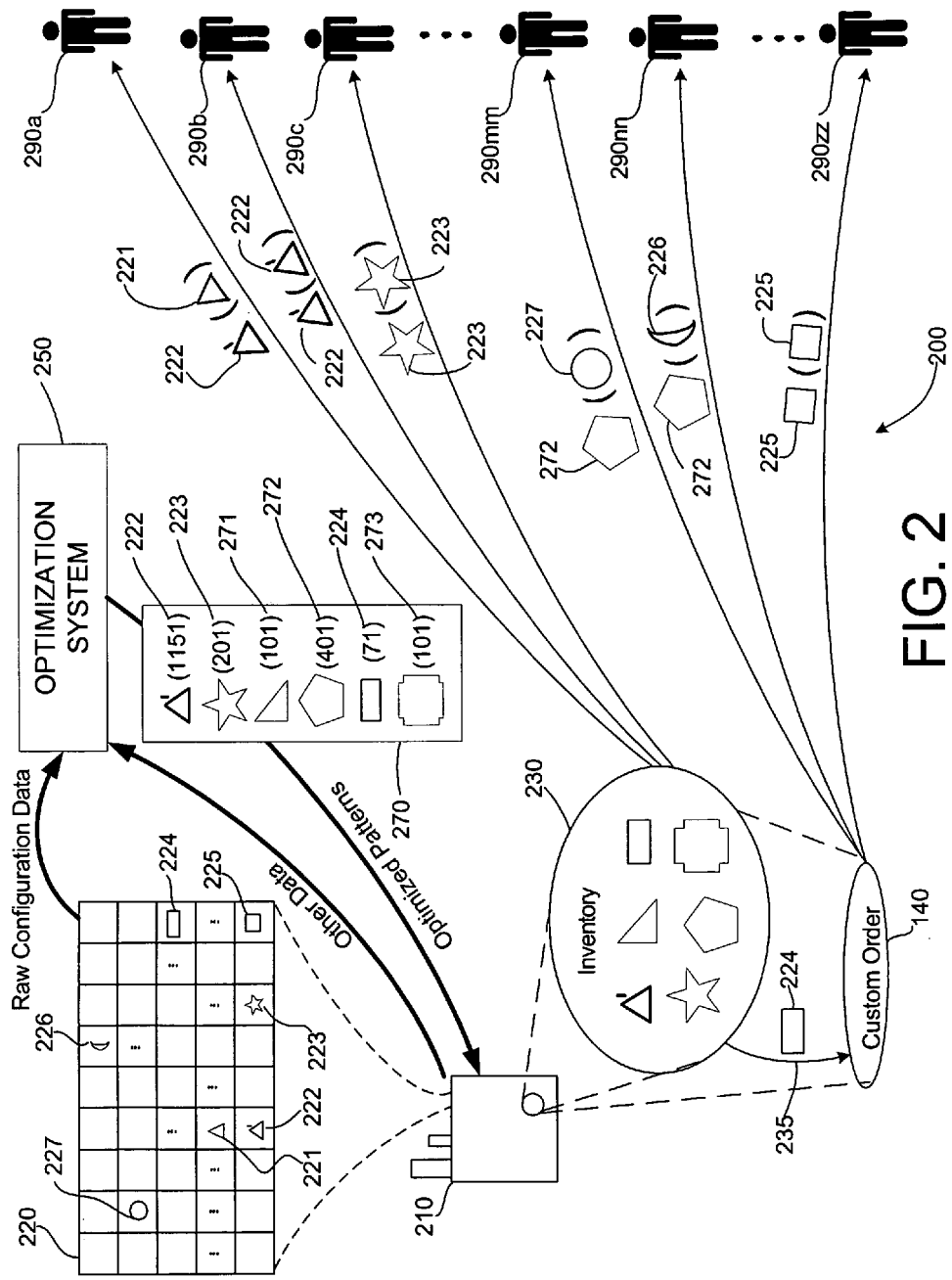
FIG. 2 is a system view of a preferred embodiment of a manufacturing-sales system of the present invention.

In contrast, FIG. 2 illustrates a simplified, preferred manufacturing-sales system 200 of the present invention. The manufacturing-sales system 200 includes a manufacturer 210 and a plurality of customers 290. Table 220, which is redacted for simplicity, illustrates the wide array of product configurations available from the manufacturer 210. Again, using the previous tractor example, the nine columns of the table 220 represent the nine possible customer-selectable features for tractors manufactured by the manufacturer 210. Each row represents one of the options for each of the nine features. If there are an average of four options for each of the nine features and if all possible combinations of features can be built by the manufacturer 210, then there are over 250,000 possible tractor configurations, each represented by one of the grids of the table 220. A number of exemplary, but specific and different product configurations 221, 222, 223, 224, 225, 226, 227 are shown in the table 220, such different product configurations each having their own respective geometric shape for identification purposes.

Unlike the system 100 of FIG. 1, in the system 200 of FIG. 2, the manufacturer 210 provides its list of all product configurations, as shown in table 220 to an optimization system 250. It being understood that not all product configurations shown in table 220 will be made available to its customers 290. The manufacturer 210 also provides other information 260, as described in greater detail hereinafter, to the optimization system 250.

Details of the optimization system 250 will be described in greater detail with reference to FIG. 3 and following. It should also be understood that optimization system 250 may reside in or with the manufacturer 210 or it may reside with a third party (not shown). Preferably, the optimization system is a computerized system for performing the various methods and processes of the present invention. As the result of these processes and methods, the optimization system 250 generates a list of preferred configurations 270 back to the manufacturer 210. The exact format and content of the list of preferred configurations 270 will vary depending upon what parameters and goals have been identified by the manufacturer 210 and based on the exact content of the table of possible configurations 220 and other information 260 provided to the optimization system 250, as will become apparent throughout the remainder of this detailed description.

In this example of FIG. 2, the list of preferred configurations or optimized patterns 270 indicates to the manufacturer 210 that the manufacturer 210 should manufacture 1151 units of configuration 222, 201 units of configuration 223, 71 units of configuration 224, 101 units of newly-identified configuration 271, 401 units of newly-identified configuration 272, and 101 units of newly-identified configuration 273. Such units are preferably manufactured and maintained in inventory 230. The list of preferred configurations 270 also indicates what product configurations match up with which product demand—since it is understood that not all configurations demanded will be manufactured and that particular configurations manufactured are designed potentially to satisfy a greater demand or broader set of demanded configurations.

As shown, FIG. 2 illustrates the fact that although customer 290a has demand for configuration 221, customer 290a is willing to accept and does buy configuration 222. Configuration 222 may be an upgrade of configuration 221, which the customer 290a is willing to accept, or it may represent a more profitable configuration than configuration 221 but one that customer 290a is nevertheless willing to accept or pay a higher cost for even though it is not exactly the configuration specifically wanted. FIG. 2 also illustrates that customer 290b has demand for and buys configuration 222 and that customer 290c has demand for and buys configuration 223. FIG. 2 further illustrates the fact that customer 290mm has a demand for configuration 227 but is willing to accept and does buy configuration 272, which the manufacturer 210 has in its inventory 250 based on the customer analysis previously performed by the optimization system 250. Similarly, customer 290nn has demand for configuration 226 but accepts the same configuration 272.

Finally, FIG. 2 illustrates that the manufacturer 210 still has the option of keeping configuration 224 in inventory 230 and converting such configuration 224 to configuration 225, as shown by arrow 235. In this situation, the manufacturer 210 is able to meet the small demand for configuration 225, as desired and requested by customer 290zz. Alternatively, although not illustrated, the manufacturer 210 could choose not to satisfy the minimal demand for configuration 225 and lose customer 290zz. In some situations, it would be more profitable and less costly for the manufacturer 210 to ignore or lose some small segment of demand (or its market) rather than incurring the cost of meeting the custom order request.

Figure 3:
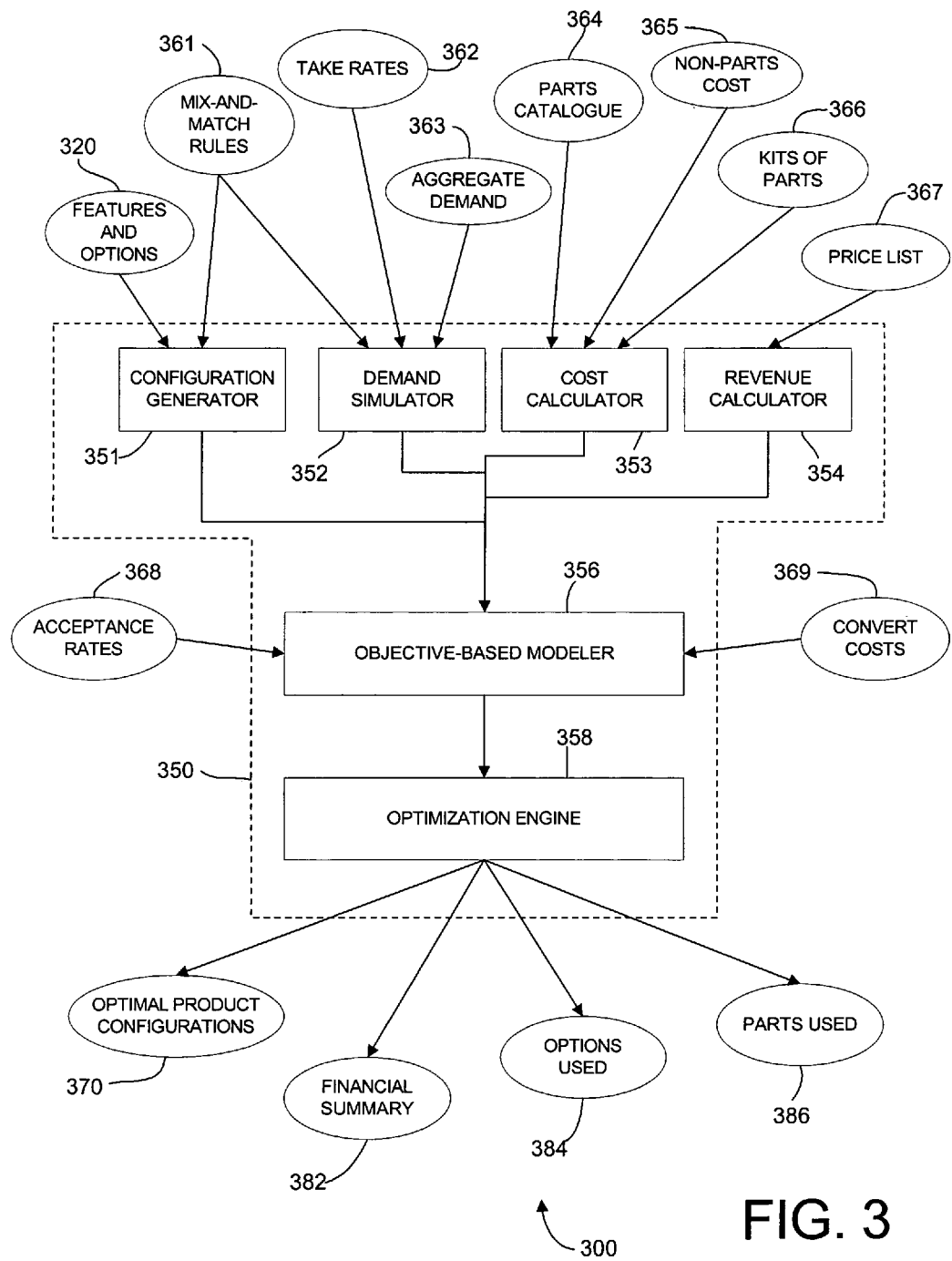
FIG. 3 is an input and output system view of a preferred embodiment of a manufacturing-sales system of the present invention.

Turning now to FIG. 3, a more detailed diagram 300 showing the interaction and exchange of data between the manufacturer 210 and optimization system 250 of FIG. 2 is illustrated. The optimization system 350 is represented in dotted line. The optimization system 350 includes a configuration generator 351, a demand simulator 352, a cost calculator 353, a revenue calculator 354, an objective-based modeler 356, and an optimization engine 358. The data inputs into the optimization system 350 include features and options 320, which generally corresponds with the product configuration table 220 from FIG. 2. The data inputs further include mix and match rules 361, take rates 362, aggregate demand 363, parts catalogue 364, non-parts cost 365, kits of parts 366, price list 367, acceptance rates 368, and convert costs 369. Some or all of such data inputs may or may not be available to the optimization system 350, usually depending upon what data is available and accessible by the manufacturer 220 (from FIG. 2). Further, some or all of the data inputs may or may not be needed depending upon what outputs and optimization is required or requested. As shown, features and options 320 and mix and match rules 361 are provided to the configuration generator 351. Mix and match rules 361, take rates 362, and aggregate demand 363 are provided to the demand simulator 352. Parts catalogue 364, non-parts cost 365, and kits of parts 366 are provided to the cost calculator 353. Price list 367 is provided to the revenue calculator 354. Acceptance rates 368 and convert costs 369 are provided directly to the objective-based modeler 356. Further, outputs from the configuration generator 351, the demand simulator 352, the cost calculator 353, and the revenue calculator 354 are also provided directly to the objective-based modeler 356. Outputs from the objective-based modeler 356 are provided directly to the optimization engine 358. Outputs from the optimization engine 358 include optimal product configurations data 370, which corresponds roughly to the list of preferred configurations 270 (from FIG. 2). Outputs from the optimization engine 358 also include financial summary data 382, option used data 384, and parts used data 386.

Representing Product Configurations in n-Dimensional Space

In order to understand how the optimization system of the present invention functions, it is first necessary to understand how a list of product configurations is preferably represented in a useable and mathematically meaningful format. Assume, for example, that the previous tractor we have been discussing has the following nine features, each of which is custom orderable by the customer: Model, Front Axle, Transmission, Rollover Protection System (ROPS), Power Takeoff (PTO), System Control Valve (SCV), Draft links, Hitch, and Tires. For purpose of this discussion, it is not necessary to understand the functionality or purpose of each feature. However, it should be understood that this number of features for the tractor example is on the low side for a typical configurable product. Assume further, for purposes of this example, that each feature has multiple options: there are 6 possible Models, 2 kinds of Front Axles, etc. A complete list of the options for each feature is listed in the table 400 of FIG. 4. The total number of possible configurations for this tractor example can then be calculated by multiplying the number of options for each of the nine features: (i.e. 6×2×3×2×2×3×2×2×20=34,560). Thus, the total number of configurations is 34,560—although, as will become apparent hereinafter, there are some combinations of the 34,560 possible combinations that are not "permitted" (e.g., "2-wheel drive front axle" and "4-wheel drive 45** tires"). Hence, the manufacturer has a pool of 34,560 possible configurations from which to select the best set of configurations to satisfy customer demand, while meeting his corporate goals.

Conventionally, a single product configuration of the above 34,560 possible will be represented textually or in a table by the list of its features and options. For example, one possible product configuration for a tractor could be represented as the following list of (eight out of nine possible) features:
Model 1
2-wheel drive
SST transmission
Folding roll-over protection system (ROPS)
Less power take off (PTO)
Dual system control valve (SCV)
Flat bar draft links
2-wheel drive 4030 tires
Because this example does not have a hitch, which is one of the nine possible features, such feature is not conventionally listed.

In contrast with a conventional list or table, the present invention makes use ordered sets of features and options to characterize the same product configuration. Referring back to our previous tractor example, the same product configuration listed above in conventional manner may be identified according to the present invention as a 9-dimensional array in the following manner:
{1,2,1,2,1,2,2,0,4}
or
(121212204)
or
{001/1/01/1/0/01/0/0/00011}
or the like.

Obviously, such an array can be represented with alphanumeric characters, in binary, in hexadecimal, or any other code or numeric representation. Further, there may or may not be any separators (e.g., "," or "/" or "." or "_" or the like) between each feature. For such an array to be useful, all nine features that may vary or that are configurable for this particular product must be presented or included in the array, each must have its appropriate location in a pre-designated order, each must have a pre-specified number of possible digits or "digit field" (where such digit field size will depend upon the type of code being used), and each number must correspond with one of the possible known values for each respective feature. For example, as shown in the table 400 of FIG. 4, there are six possible model options: {Model 1, Model 2, Model 3, Model 4, Model 5, and Model 6}. Model 1 may be arbitrarily represented by a "1" "A" "0" "00" "Model_1" or the like in its predefined location of the product configuration array.

For example, in the first array presented above {1,2,1,2,1, 2,2,0,4}, the 1 in the first location of the array is understood or predefined to mean "Model 1," the 2 in the second location means "2-wheel drive," the 1 in the third location means "SST transmission," the 2 in the fourth location means "folding roll-over protection system (ROPS)," the 1 in the fifth location means "less power take off (PTO)," the 2 in the sixth location means "dual system control valve (SCV)," the 2 in the seventh location means "flat bar draft links," the 0 in the eighth location means "no hitch," and the 4 in the ninth location means "2-wheel drive 4030 tires." It should be understood by the reader that the above tractor example has been made artificially simple merely to illustrate the power and capability of the system and methods of the present invention. In real world applications, the number of features and options will often increase dramatically. Nevertheless, this simple example provides sufficient detail to explain the present invention hereinafter. As will be seen, this tractor example will be presented and discussed herein at a fairly high level, without sacrificing detail, to enable the reader with little knowledge of tractor product lines to understand the present invention and how it can be applied to many other types of products and services having many possible configurations.

As will be explained in greater detail hereinafter, the above array representation of a product configuration provides the basis and groundwork by which mathematical models, rule sets, and known mathematical algorithms may be applied to define product configuration spaces in which product configuration neighborhoods may be defined, in which one product configuration may be defined to dominate or capture others, and in which meaningful proximity or closeness between any two configurations may be determined, as will be explained hereinafter.

Once individual product configurations are represented as n-dimensional arrays, with corresponding and respective cost, revenue, and demand, it then becomes possible to identify which configurations a manufacturer should produce. Configurations can also be analyzed to optimize economic results, whether to maximize profit contribution, minimize cost, or obtain some other, more specialized objective. It also becomes possible to identify how many different configurations of a product should be manufactured and how many of each should be manufactured.

Figure 5:
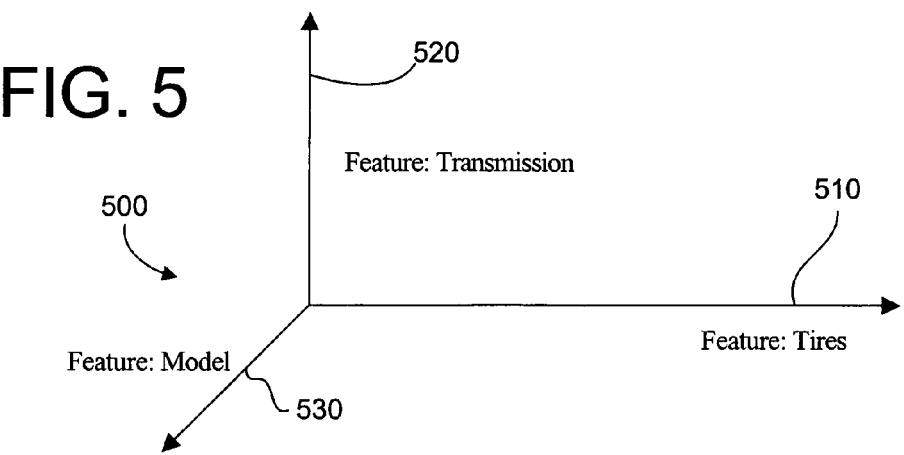
FIG. 5 is a 3-dimensional axis illustrating three of nine features of the product example of FIG. 4.

Turning now to FIG. 5, it is possible to represent the features of a product configuration on a plurality of axes. For example, three features of the product configuration space 500 for the present tractor example may be represented by three axes. As shown, the Tires feature is mapped along the conventional x-axis 510, the Transmission feature is mapped along the conventional y-axis 520, and the Model feature is mapped along the conventional z axis 530.

To map the entire tractor product, each feature would be mapped on an orthogonal (perpendicular) axis. Because there are nine configurable features, there would be nine axes—one for each feature. The axes would be orthogonal to each other—like in the Euclidean space. Thus, the product configuration space for the present tractor example would be a nine-dimensional space. Spaces of dimension higher than three, while impossible to draw orthogonally on a two dimensional piece of paper, are quite ordinary and capable of manipulation in mathematics.

As mentioned earlier, each feature associated with the tractor example has multiple options. FIG. 6 illustrates the nine features of the product configuration space 600 for the present tractor example, with each of the nine features shown on a separate axis. Although it cannot be shown graphically, it should be understood that each of the nine axes is orthogonal to the others. In addition, all of the possible options for each feature are mapped onto the appropriate axis. More specifically, the Tires feature is mapped along axis 610, with each of its 20 customer-orderable options shown as points 615, the Transmission feature is mapped along axis 620, with each of its three customer-orderable options shown as points 625, the Model feature is mapped along axis 630, with each of its six customer-orderable options shown as points 635, the Front Axle feature is mapped along axis 640, with each of its customer-orderable options shown as points 645, the ROPS feature is mapped along axis 650, with each of its customer-orderable options shown as points 655, the SCV feature is mapped along axis 660, with each of its three customer-orderable options shown as points 665, the Draft Links feature is mapped along axis 670, with each of its customer-orderable options shown as points 675, the PTO feature is mapped along axis 680, with each of its customer-orderable options shown as points 685, and the Hitch feature is mapped along axis 690, with each of its customer-orderable options shown as points 695.

Based on the above, all the features and options of the exemplary tractor can now be mapped into a product configuration space. As was briefly explained earlier, each specific product configuration may be represented by a vector of 9 coordinates (e.g. {1,2,1,2,1,2,2,0,4}. Such an n-tuple vector represents a point in the product configuration space or an ordered set of coordinates. In this case, this product configuration space is 9-dimensional.

As should be apparent, the dimension of a particular product configuration space is the number of features that the product has. Hence, if a product has 20 features, it will be represented in a 20-dimensional space. Each configuration of the product will be represented by a vector with 20 coordinates.

Figure 7:
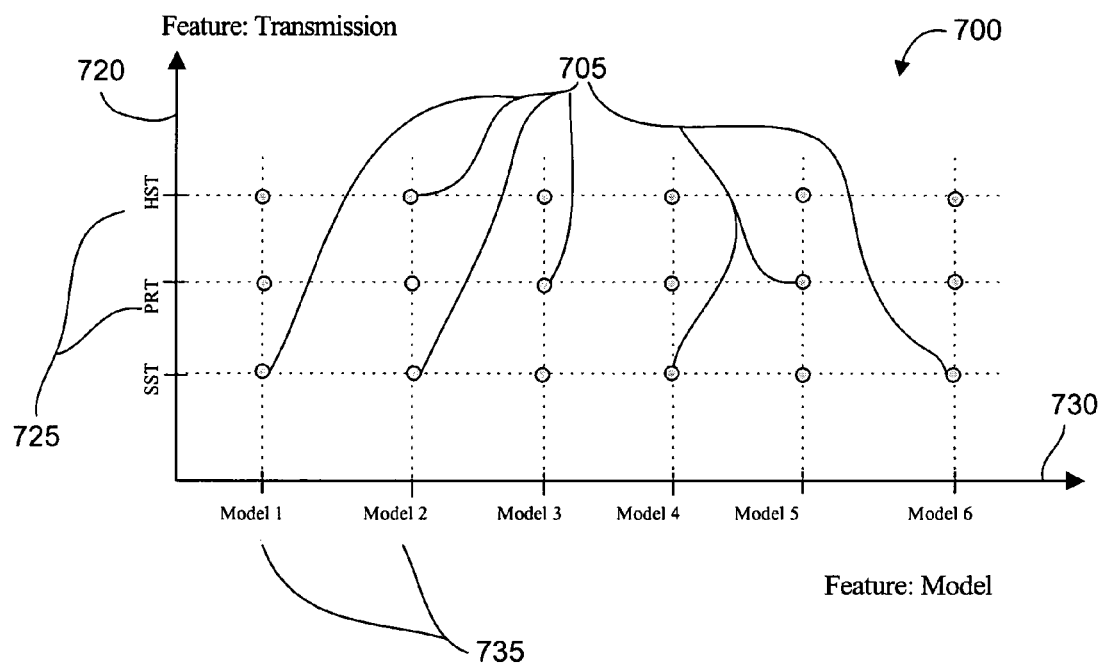
FIG. 7 is a 2-dimensional configuration space illustrating two of nine features of the product example of FIG. 4 with all possible option combinations shown as coordinates of the space.
Figure 8:
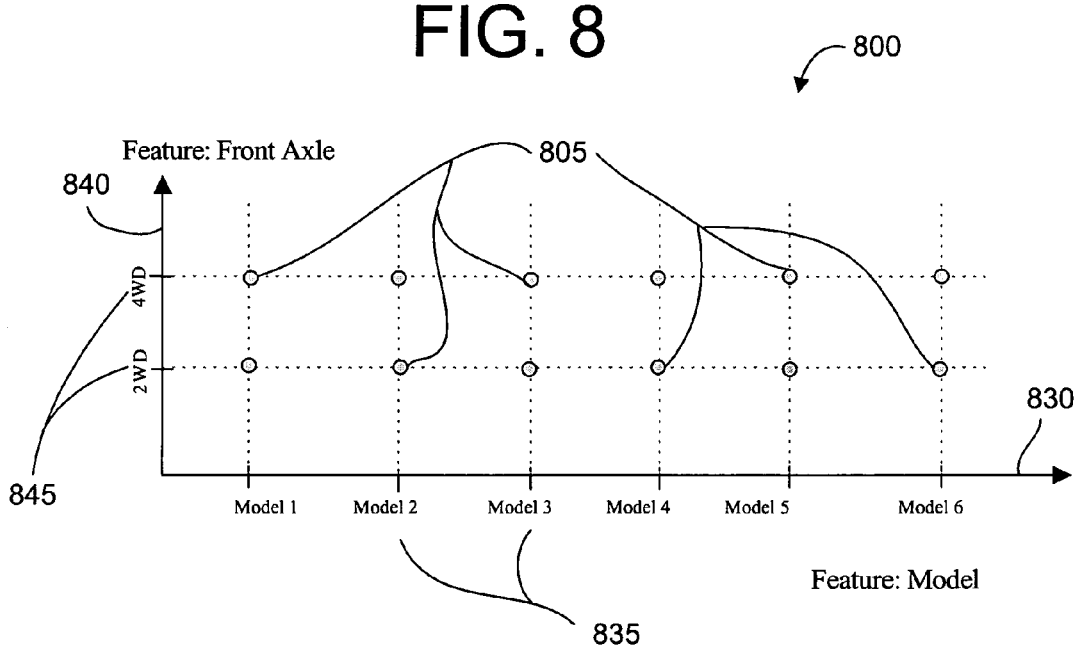
FIG. 8 is another 2-dimensional configuration space illustrating two of nine features of the product example of FIG. 4 with all possible option combinations shown as coordinates of the space.

Because it is impossible to show all 9-dimensions simultaneously in a diagrammatic representation, FIGS. 7 and 8 are representative of the product configurations of 2 respective dimensions of our 9-dimensional tractor configuration space. For example, FIG. 7 illustrates configuration space 700 with the Model feature along axis 730 mapped with the Transmission feature along axis 720. The six options 735 of the Model feature are spaced along the Model axis 730 and the three options 725 of the Transmission feature are spaced along the Transmission axis 720. In this space 700, there are eighteen coordinate points 705 representing each of the unique and possible configurations based solely on these two features, Model and Transmission. Similarly, FIG. 8 illustrates configuration space 800 with the Model feature along axis 830 mapped with the Front Axle feature along axis 840. The six options 835 of the Model feature are spaced along the Model axis 830 and the two options 845 of the Front Axle feature are spaced along the Front Axle axis 840. In this space 800, there are twelve coordinate points 805 representing each of the unique and possible configurations based solely on these two features, Model and Front Axle. As stated previously, if all 9 dimensions could be represented in a single graphic, then there would be 34,560 coordinate points.

Representing Mix-and-Match Rules for a Configurable Product

Mix-and-match rules may also be referred to as "compatibility rules." The mix-and-match rules guide which product options can be paired with other options, and what configurations are valid (or not valid). These rules are generally derived as a result of engineering design, operational limitations, or marketing constraints associated with the manufacturer of the product. For example, tractor engineering restrictions may mandate that a higher powered transmission not be matched with weak tires or, similarly, that a four-wheel drive front axle be matched with only four-wheel drive tires.

Mix-and-match rules discriminate between configurations that are valid and those that are not. Thus, out of a universe of 34,560 "possible" tractor configurations, the number of "valid" configurations, based on application of the mix-and-match rules may be, in fact, much less. To illustrate the role of mix-and-match rules, consider the following rules for the tractor example.

| | |
|---|---|
| Rule 1. | Model 3 must be 4 Wheel Drive |
| Rule 2. | Model 6 must be 4 Wheel Drive |
| Rule 3. | Model 1 must have an SST transmission or an HST transmission |
| Rule 4. | Model 3 must have a PRT transmission or an HST transmission |
| Rule 5. | Model 4 must have an SST transmission or a PRT transmission |
| Rule 6. | Model 6 must have a PRT transmission or an HST transmission |

There are two types of mix-and-match rules: first order rules and higher order rules. First order rules involve only two features and are a special case of the higher order rules, which can involve any number of features. First order rules are usually the most common. Higher order mix-and-match rules are rules that involve three or more features. Higher order rules are also called "disallowed combination rules." The higher order rules describe product configurations that are not allowed or are invalid. Each class of rules is treated separately.

A preferred syntax for first order rules is illustrated as follows:
Feature1; Option1; relation; Feature2; Option2
The "relation" is preferably represented by the following mathematical symbols: NE, EQ, EE, or OR. NE means that if feature1 is at option 1, then feature2 "cannot be" at option2. EQ means that if feature1 is at option1, then feature2 "must be" at option2. EE means that feature1 can be at option1 "if and only if" feature2 is at option2. Finally, OR allows several feature2-options2 to be associated with a particular feature1-option1. The table 900 of FIG. 9 illustrates how these particular relationship operators function.

Using the above syntax, a rule stated as "Model 3 must be 4 Wheel Drive" would be expressed as: Model Model_3 EQ Front Axle 4WD. Further, the rule stated as "Model 1 must have an SST transmission or an HST transmission" would be expressed as: Model Model_1 OR Transmission SST; Model Model_1 OR Transmission HST. Table 1000 in FIG. 10 illustrates a full list of preferred mix-and-match rules for the nine exemplary features of the present tractor example.

As stated previously, higher order rules are more complex than first order rules, involve three or more features, and describe product configurations that are not allowed or are invalid. A preferred syntax is:
Rule_name feature_name option_name yes/no Using the above syntax, a rule stated as: "A Model 1 tractor with 2 Wheel Drive and an SST transmission cannot have a Mid_PTO" would be expressed as:

| Rule1 | Model | Model_1 | yes |
|---|---|---|---|
| Rule1 | Front_Axle | 2WD | yes |
| Rule1 | Transmission | SST | yes |
| Rule1 | PTO | Mid_PTO | yes |

This means that any configuration that looks like (Model_1, 2WD, SST, *, Mid_PTO, *, *, *, *) is invalid where the "*" denotes any option value of the corresponding feature. Thus, a configuration (Model_1, 2WD, SST, Folding_ROPS, Mid_PTO, Dual_SCV, Less_Draft_Links, Domestic_Hitch, 2WD_4005) would be invalid.

If a Model 1 with 2WD and SST has to have a Mid_PTO, then the final line of Rule1 would look like:
Rule 1 PTO Mid_PTO no
This would mean that configurations like (Model_1, 2WD, SST, *, Less_PTO, *, *, *, *) are invalid.

As used herein, multiple lines with the same rule name (e.g. "Rule 1") constitute the rule. The numbering or naming of the rules is arbitrary and just serves to group lines together. This syntax allows any rule that depends on the choices made for any number of features to be expressed. The table 1100 of FIG. 11 illustrates a plurality of higher order rules for the simple tractor configuration example.

As stated previously, the mix-and-match rules eliminate a large number of product configurations. The configurations that are eliminated are not valid; and cannot be built or marketed due to operational, engineering, or other constraints. Thus, the mix-and-match rules play a very important role in defining and reducing the "possible" product configuration space down to a "valid" configuration space.

In the present tractor example, the original number of possible product configurations is 34,560. Once the mix-and-match rules illustrated in FIGS. 10 and 11 have been applied, this possible configuration space is reduced to 2,832 valid configurations. The set of valid configurations is very important—because any one of these configurations can be built, marketed, ordered, and delivered to a customer. The set of configurations that a manufacturer (or other company) actually offers its customers is preferably a subset of this full set of valid configurations.

Figure 12:
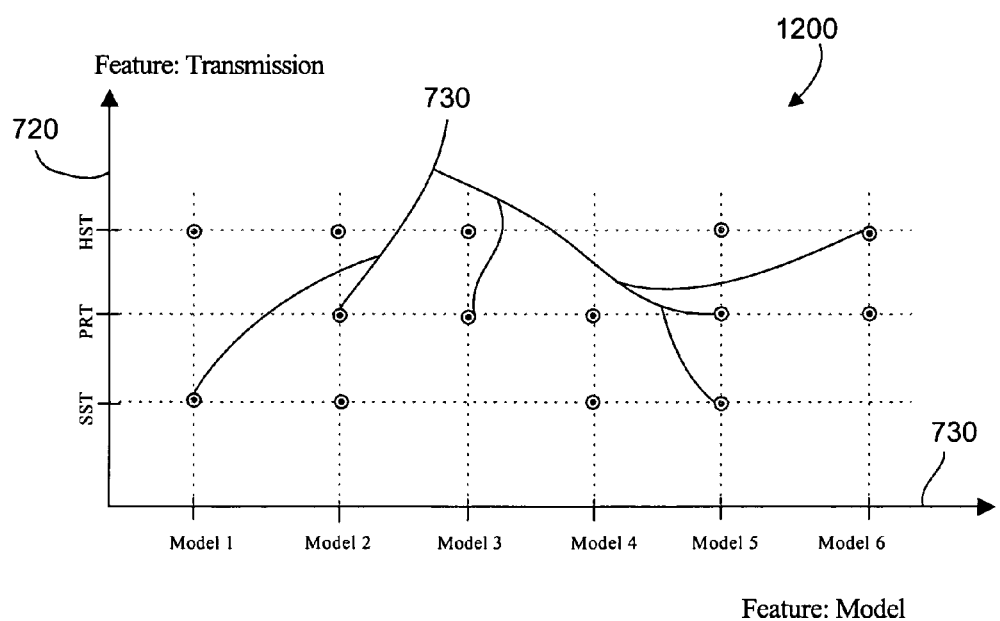
FIG. 12 is the 2-dimensional configuration space of FIG. 7 in which only valid option combinations based on the mix-and-match rules of FIGS. 10 and 11 are shown as coordinates of the space.
Figure 13:
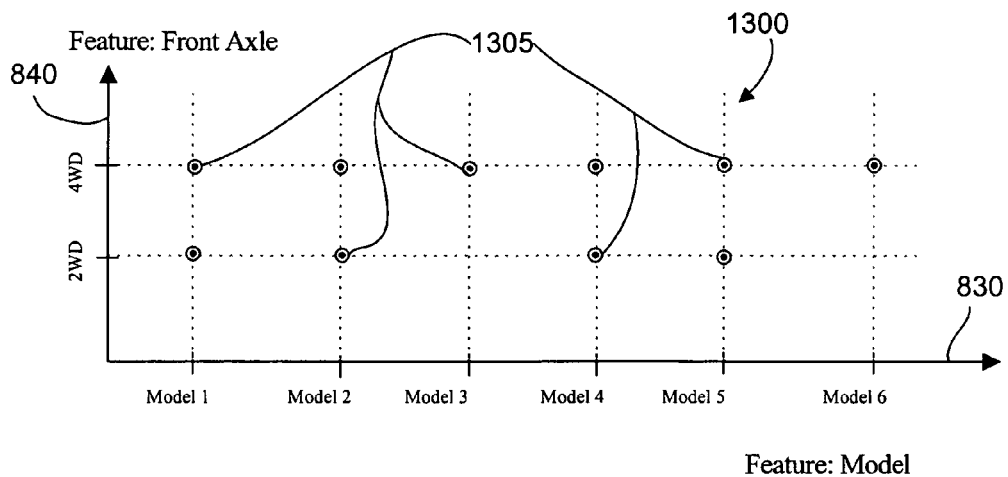
FIG. 13 is the 2-dimensional configuration space of FIG. 8 in which only valid option combinations based on the mix-and-match rules of FIGS. 10 and 11 are shown as coordinates of the space.

The two dimensional configuration spaces 1200 and 1300 of FIGS. 12 and 13, respectively, illustrate the impact of the mix-and-match rules on the two dimensional spaces 700,800 previously shown in FIGS. 7 and 8. For example, there are now only fourteen valid coordinate points 1205 in space 1200 and there are now only ten valid coordinate points 1305 in space 1300.

There are standard mathematical algorithms that can be used to enumerate or identify the valid configurations, after applying the mix-and-match rules. Such algorithms and the principles for their use are described in greater detail in Aho, A. V., J. E. Hoperoft, and J. D. Ullman [1975], *The Design and Analysis of Computer Algorithms*, Addison-Wesley Publishing Company, Readings, Mass., Chap. 5, pp. 172-179 (hereinafter "Aho"), and Horowitz, E. and S. Sahni [1976], *Fundamentals of Data Structures*, Computer Science Press, Inc., Potomac, Md., Chap. 6, pp. 282-301 (hereinafter "Horowitz"), each of which is incorporated herein by reference in its entirety and submitted herewith. The "fast enumeration" of the valid configurations is an important requirement for the optimization of the product configurations, especially when the number of possible configurations is extraordinarily large. For a more detailed discussion, please see Nemhauser, G. L. and L. A. Wolsey [1988], *Integer and Combinatorial Optimization*, John Wiley & Sons, Inc., New York, N.Y., Chap. 6, pp. 176-191, which is incorporated herein by reference in its entirety and submitted herewith. It should be understood that a "complete enumeration" would examine all 34,560 possible configurations in the present tractor example, apply the mix-and-match rules, and decide which of the possible configurations are valid. In contrast, fast enumeration, also called partial enumeration or implicit enumeration, applies the mix-and-match rules to partial configurations. For example, if a rule only involves Model and Front Axle features, then it can be applied just once to all of the configurations that have the same choices for Model and Front Axle. If Model and Front Axle are chosen, then there are seven more features and if it assumed that each has about four choices or options, then there are 16,384 complete configurations for every partial one. That means applying the rule once instead of 16,384 times. For example, if (Model 3, 2WD) is invalid, then all of the configurations (Model_3, 2WD,*,*,*,*,*,*,*) are invalid. The optimization algorithms described hereinafter will then be applied to the set of valid configurations to determine the "optimal configurations" that a company/manufacturer needs to build. Obviously, the ability to reduce a large set of possible product configurations to a more manageable set of valid configurations and, further, to quickly identify valid configurations speeds up the entire optimization process of the present invention and, using current computer technology, a prerequisite for optimizing for products having many thousands, millions, or more possible configurations.

Configuration analysis and optimization is a new field of study because even a relatively simple product, like a desktop computer, can have millions of possible configurations. Sifting, sorting, and searching through these vast sets of configurations has been beyond the capability of manual processes and, in fact, beyond the speed and capacity limitations of computers systems until only recently.

Further, it should be understood that the present invention's use of ordered sets of features and options to characterize product configurations should not be confused with conventional mapping of non-numeric data into a multi-dimensional coordinate space, as is commonly done in statistics (e.g., analysis of variance, factor analysis, and conjoint analysis). In conjoint analysis, the dimensions correspond to the features of a product and the aim of the analysis is to discover the relative importance of the features to consumers. The output of such analysis is a set of weights, or utilities, for the options of each feature. A product configuration is a list of options, and it is assumed that the utilities for these options can be merely added up to compute the total utility of any given configuration. The utilities are estimated for individual consumers or for market segments. The underlying assumption is that if a consumer is presented with alternate configurations of a product, the consumer will chose the one that provides the maximum utility (i.e., the highest added score). While such analysis has its uses, it does not provide the framework for identifying configuration neighborhoods and relationships, as used in the present invention.

Nevertheless, utility calculations obtained through conjoint analysis do provide some benefit to the present invention because such calculations provide a useful means of estimating the probability that one customer who wants one option will be willing to accept a different one. It seems reasonable to suppose that a consumer will be willing to switch as long as the change in utility does not exceed some arbitrary threshold, and that the probability of switching is proportional to the difference in utility. This will be described in greater detail hereinafter.

Calculation of Cost and Revenue for Each Valid Configuration

Product configuration optimization is performed on the set of valid configurations (as opposed to all possible configurations) to determine the "best set" of configurations for the manufacturer to build and offer to customers. To compute the "best set" of configurations, each configuration should preferably have an assigned cost, revenue, and demand number. The process for computing cost and revenue for each configuration is discussed hereinafter.

Specifically, each valid configuration of the product has an associated cost and revenue. The cost will include both the cost of parts and other costs such as direct labor, indirect labor, work-in-process inventory, warranties, transportation, and procurement. There are several different ways that a company may have or derive these costs. For example, the parts and non-parts costs may be lumped together into a single cost for each option of each feature. Alternatively, the non-parts costs may be separated into different categories (e.g. labor, inventory, warranty, etc.) and a cost given for each category for each feature/option.

The parts cost is calculable from a bill-of-materials associated with each feature/option, along with a catalog of parts and their unit costs. Sometimes, however, the bill-of-materials required for a given option depends on which other options are included in the chosen configuration. To handle such scenarios, the present invention examines the concepts of kits and their applicability rules.

For ease of explanation and understanding, we will arbitrarily limit the assembly to one or two levels of bill-of-materials. Hence, it will be assumed that the manufacturer of a particular product assembles the product from a set of parts, and may or may not assemble those parts from another layer of more basic parts. For example, a computer manufacturer generally assembles only the final layer of the computer. The hard drive is treated as a single part. The many sub-parts that make up the hard drive are of no interest. A tractor maker, on the other hand, builds the transmission from a large number of parts and then puts the finished transmission into the tractor. For our tractor example, we will assume that there is at most a two level assembly process. The product is assembled from the choice of options for each feature. Each option is in turn assembled from a set of parts (perhaps only one). The methodology described herein can be extended easily by one skilled in the art to handle multiple levels of bill-of-materials. In other words, many layers of parts can be assembled into sub-assemblies before finally being assembled into an end product configuration.

In some cases, each option has a set of basic parts that are used if and only if that option is chosen. The more general case, however, is that the basic parts are grouped into "kits," and the set of kits needed depends on the whole configuration. In the tractor example, a certain kit is used for the HST transmission, but it is only needed if the tractor has an HST transmission and also has 4 wheel drive.

A kit consists of a set of parts, with a quantity required for each part. The quantity is usually a count, but can also be length, or any other measurement of quantity. For example, the units can be expressed as 3 units for bolts or 4.5 feet for a hose. A kit also has an "applicability rule" that governs when it is used. The applicability rule determines which configurations need which kit.

In the present example, it will be assumed that all of the valid configurations of the sample tractor may be assembled from a collection of seventy-five kits, which draw upon a basic set of 1273 parts. One of these kits, named KIT276, contains seventy-one different parts. The first ten of these seventy-one parts are shown in the table 1400 of FIG. 14. In the present example, one unit of part number YZ18125 is required for the valid tractor configurations, two units of part number M137828 are required, etc. All of the part numbers needed for the tractor are listed in a parts catalog, along with their unit cost. Turning to FIG. 15, an excerpt 1500 from such a parts catalog, having the parts previously identified in table 1400 from FIG. 14, is shown. Thus, it is possible to compute the total parts cost for any valid configuration—if the kits required by each configuration are known. Stated another way, the parts cost for any particular valid configuration is the sum of the parts costs for the respective kit(s). Each valid configuration must be tested against the applicability rule of each kit to determine which kits are needed.

Just as there is a syntax for the mix-and-match rules described above, there is also a preferred syntax for expressing these applicability rules. The preferred syntax used in the present invention is:

kit_name mask_number feature_name option_name yes/no

This syntax enables any applicability rule to be put into disjunctive normal form. It should be understood that a logical expression is in "disjunctive normal form" if it consists of a set of first level clauses that are connected by OR operators, and each of these first level clauses consists of second level clauses that are connected by AND operators. Second level clauses may contain the NOT operator. Any logical expression involving the OR, AND, and NOT operators can be put into disjunctive normal form.

Thus, the applicability rule for a kit consists of one or more lines, each of which begins with the kit name. Each AND clause consists of one or more lines that have the same mask number. Different mask numbers correspond to different AND clauses that the rule is OR'ing together.

FIG. 16 illustrates the applicability rule 1600 for a single kit, KIT276. In summary, applicability rule 1600 basically states that: KIT276 is needed for a Model 1, with an SST transmission, 4 Wheel Drive, but no Mid_PTO (i.e. this is "Mask 1"). Mask 2 part of applicability rule 1600 states that KIT276 is needed for a Model 2 under the same configuration circumstances. The values of any of the other features for these tractor configurations does not impact the need for KIT276.

To summarize, the parts that are assembled to make the complete product are organized into kits, and each kit has an applicability rule that specifies which configurations need that kit. Given any product configuration, it is possible to apply the applicability rules to find out which kits are needed to build the configuration. Then, having the list of necessary kits, and the catalog with prices per kit (or parts that make up each kit), it is then possible to compute the total parts cost for each valid configuration.

The revenue for a configuration is usually much easier to compute than the cost. The revenue, or selling price, of a particular configuration is given as a base price for each model (the set of models is a feature), and incremental prices for the various options of the other features. The incremental price for an option that is included in the base price is zero. The incremental price can be negative for an option that is a downgrade of what is in the base price. Table 1700 of FIG. 17 illustrates an exemplary revenue structure for the sample tractor of the present discussion example. There is a base price for each of the six models, and then there is an incremental price increase (or decrease) for the other options for the other eight features, which vary by model (columns 1-6). An incremental price of zero means that the option is included in the base price, or that the option is not available for that model.

As an example, the configuration (Model_1, 4WD, SST, Folding_ROPS, Mid_PTO, Triple_SCV, Less_Draft_Links, Domestic_Hitch, 4WD_4510) from FIG. 17 would have a list price of $16,239. This is calculated from a base price of $15,169 for Model_1, $0 increase for 4WD, SST, and Folding_ROPS, since these are all included in the base price for the Model_1, $390 for a Mid_PTO, $950 for a Triple_SCV, $220 for a Domestic_Hitch, $210 for the 4WD_4510 tires, and a price reduction of $700 for not taking the Draft_Links.

Demand Simulation at the Product Configuration Level

As stated previously, the valid configuration space contains every configuration of a product that could be ordered by a customer. Obviously, from common experience, it should be self-evident that some configurations are or will be more popular than others. The relative popularity (or "demand") of the different configurations, relative to each other, must be known, determinable, or estimable for the present invention to determine the optimal set of configurations to produce. The reliability of the optimization calculations obtained from the optimization engine will be directly proportional to the accuracy of the demand figures that are used by or input into the optimization engine. Historically accurate demand figures enable the optimization to determine historically accurate optimal configuration sets of products. As will be described later, future optimal configuration sets may be estimated based on such historical data. Alternatively, if demand for particular products is capable of manipulation (e.g., through advertising, impression, perceived need, etc.), it is also possible to project optimal configuration sets for future production based on estimated future demand—irrespective of historical demand data.

With regard to historical demand data, most sales forecasts are at the aggregate level, or only down to the level of specific models. Forecasting at the configuration level is more difficult (and potentially less accurate), especially for low volume configurations. The present invention addresses this issue by simulating demand at the configuration level, using the history of demand by feature and option. That is, for each feature, a history of demand broken down by the options for that feature. For example, assume in the present tractor example that 5% of tractor buyers choose the 2 wheel drive, and 95% choose the 4 wheel drive. These percentages are called "take rates" or "penetration rates." For a new product, there may not be any demand history. In such situations, it is preferable to use "forecasts" estimates of demand by feature and option.

Regardless of how the demand by option is obtained or estimated, such data is then useable to simulate demand by configuration. The relative demand by option (e.g. 5% for 2WD, 95% for 4WD) is interpreted as a probability distribution over the levels of the feature. As will be appreciated by those skilled in the art, using Monte Carlo simulation, it is possible to generate a "value" for each feature of a product. The complete configuration is then tested against the previously described mix-and-match rules. If the particular configuration is valid, the calculated demand for that configuration is kept; otherwise it is discarded. This process is repeated until 15,000 valid configurations have been identified. 15,000 is used because that is the "synthetic" demand that has been determined for the tractor manufacturer in the present example. The synthetic demand is an approximation of the future demand for tractors based on the historical demand the tractor manufacturer has experienced in the past over a specified period of time. Such synthetic demand satisfies all of the mix-and-match rules and is consistent with the underlying probability distributions for each feature. See Winston, Wayne L. [1994], *Operations Research: Applications and Algorithms*, Duxbury Press, Wadsworth Publishing Company, Belmont, Calif., Chap. 23, pp. 1183-1200, which is incorporated herein by reference in its entirety and submitted herewith, for more on Monte Carlo simulation.

Table 1800 of FIG. 18 illustrates the relative popularity (i.e., demand or take rates) of the six models of the tractors being discussed in the present example. Table 1900 of FIG. 19 illustrates the relative popularity, by model, of the other eight features.

Typically, in a real world business market, a small number of configurations will account for a large share of the demand and revenue for the product for a particular manufacturer or product seller. Conversely, a large number of low volume configurations will contribute a small share of the revenue. Such configurations typically increase total cost of manufacture enough to reduce overall profitability of the company. As will be described herein, one of the primary goals of the configuration optimization of the present invention is to collapse this latter category of many low-volume configurations into fewer, higher volume configurations.

Using a demand simulation of 15,000 tractors, based on the take rates from FIGS. 18 and 19 along with the mix-and-match rules from FIGS. 10 and 11, yields 713 unique configurations with some positive demand (i.e., at least one unit of each configuration is in demand). The exact demand for each respective valid configuration depends on the take rates for all of the options for that respective configuration and on the aggregate demand level, which, in this example, is 15,000 tractors. This results in a demand for 713 out of the 2832 valid configurations. Of the 713, only 34 have a demand of more than 100 units, while 220 have a demand of only one. A redacted listing 2000 of these 713 configurations, each with its demand, revenue, and cost, is shown in FIG. 20. In particular, each "in demand" configuration is listed in the format shown by the key 2005 at the top of the list 2000. The first line 2007 of each configuration shows the number of units (out of the 15,000 total possible units) that are "in demand" based on the previously determined synthetic demand. The first line 2007 also includes the previously calculated revenue and cost for such configuration. The second line 2009 of each configuration identifies the specific options for each of the nine features of that respective configuration. The top six configurations 2010 and the last five configuration 2030 (of the 713 total in demand configurations) are shown in the redacted list 2000. The middle 702 configurations 2020 (of the 713 total in demand configurations) having a demand ranging from 338 units to only 1 unit are redacted from the list 2000.

Defining Relations on a Configuration Space

As has been stated previously, each product configuration of the present invention is represented by an ordered list of option choices. The configuration space is n-dimensional, where n is the number of features. The options for a given feature, like {SST, PRT, HST} for the Transmission feature, are not usually numeric. Obviously, there is no way to compute the "distance" between the options of a feature—distance between options of a product has no meaning. For example, what is the "distance" between a 2-wheel drive front axle and a 4-wheel drive front axle? Such a concept is meaningless. Further, even if numbers were assigned, like 1 for SST, 2 for PRT, and 3 for HST, these numbers would just be labels. Although a "distance" could be calculated between such arbitrarily assigned numbers, such distance would have no meaning in understanding the relationship between such options.

Nevertheless, it is possible to define relations between options of each feature that help explain or define concepts of "closeness" or "proximity" between the options. Three primary relations will be defined and discussed herein for representative purposes; however, it should be understood that there are many others that are possible.

UPGRADE Relation

The first primary relation defined by the present invention is called an "upgrade relation." Consider the SCV (System Control Valve) feature of our example tractor. The Triple_SCV is an upgrade of the Dual_SCV. Any customer who ordered a Dual_SCV would be glad to receive a Triple_SCV at the same price. This is like getting a bigger memory on your computer at the same price. The Dual_SCV, in turn, is an upgrade of the Less_SCV option, which really means that there is no SCV. If option "a" is an upgrade of option "b," then one way to represent this concept mathematically or in shorthand would be with the syntax: "aUPGRADEb". For reasons that will become apparent, the present invention also treats any option as an upgrade of itself—this merely means or confirms that any customer who orders "a" should be happy to get "a". Using the above syntax, this concept is represented by "aUPGRADEa" for any option a. This UPGRADE relation is called a "partial order," since it satisfies the following two mathematical properties (P1 and P2):
P1. aUPGRADEb and bUPGRADEa if and only if a and b are the same.
P2. if aUPGRADEb and bUPGRADEc, then aUPGRADEc.
Mathematical property 1 (P1) is called "uniqueness." Mathematical property 2 (P2) is called "transitivity."

Table 2100 of FIG. 21 illustrates an example UPGRADE relation for a feature. In—this case, FIG. 21 shows an UPGRADE relation for the SCV feature of the sample tractor example we have been discussing. In this table, a "1" means that the option in the row (far left column) is an upgrade of the option in the column (top row), while a "0" means that this is not true. Triple_SCV is an upgrade of Less_SCV because of transitivity. The UPGRADE relation can be defined on every feature, even if it is a trivial one. Table 2200 of FIG. 22 illustrates the UPGRADE relation for the Transmission feature. Upon review of the table 2200, it becomes readily apparent that no one transmission is really an upgrade of any other one.

With an UPGRADE relation defined on every feature of the product, it can then be stated that configuration y is an upgrade of configuration x if every feature of y is an upgrade of the corresponding feature of x. This is why it is preferable to count any option as an upgrade of itself—so that matching options still count as upgrades. If configuration y is an upgrade of configuration x, this may be shown by "yUPGRADEx". y may be determined to be an UPGRADE of x based on the following symbolic determinations. For 9 features, if $x=(x1, x2, \ldots, x9)$ and $y=(y1, y2, \ldots, y9)$ are two specific configurations of a product, then yUPGRADEx if and only if (y1)UPGRADE(x1), (y2)UPGRADE(x2), and so on up to (y9)UPGRADE(x9). Thus, a partial order on every feature induces a partial order on the configuration space.

CONVERT Relation

The second primary relation defined by the present invention is called a "convert relation." The convert relation addresses the possibility or capability of converting an existing or "in stock" product into another configuration merely by swapping out or replacing one or more of the options already on the product with the options requested by the customer. Consider the Tires feature of the current tractor example. If a customer orders a tractor with 4WD 4500 tires, and there is currently a tractor in stock or in inventory (with all of the other options requested by the customer) but with 4WD 4510 tires, the manufacturer or retailer can satisfy the customer demand, for some minor cost, simply by changing the tires on the existing tractor with the ones requested by the customer. Stated generically, if option "a" can be converted to option "b", such relationship may be represented by the following syntax: "aCONVERTb." Defined this way, CONVERT is an "equivalence relation," because it satisfies the three mathematical properties (E1, E2, and E3):
E1. aCONVERTa for every option a.
E2. if aCONVERTb, then bCONVERTa.
E3. if aCONVERTb and bCONVERTc, the a CONVERTc.

Mathematical property 1 (E1), called "reflexivity," means that any option can be converted to itself, i.e. just left alone. Mathematical property 2 (E2) is called "commutativity," while means that options a and b are interchangeable. Mathematical property 3 (E3), which is essentially the same as mathematical property 2 (P2), discussed above, is called "transitivity."

In our present tractor example, if we assume that any type of 4-wheel drive tire can be converted to any other type of 4-wheel drive tire, such CONVERT relation for 4-wheel drive tires may be illustrated in table format, similar to the UPGRADE tables from FIGS. 21 and 22. In such a table, if a "1" means that the option in the row (far left column) is convertible to the option in the column (top row), while a "0" means that this is not true, then every cell in the table would contain a "1." For other features discussed in association with the present tractor example, not all options are convertible to another (or at least not practically). For example, if a tractor is built with an SST transmission, it is not practical (or it is cost-prohibitive) to convert it to an HST transmission. Table 2300 of FIG. 23 illustrates the CONVERT relation for the Transmission feature in which no transmission can be converted to any other. The 1s in table 2300, however, indicate that each option can be "converted" to itself.

A product will generally have a mixture of features that can be converted and other features that cannot. Just as with the UPGRADE relation, it is possible to extend the CONVERT relation to whole configurations. Thus, it is possible to state that configuration y can be converted to configuration x (written "yCONVERTx") if every option of y can be converted to the corresponding option of x—where just leaving something alone counts as a conversion. This requires implicitly that x and y must match on all of the features that cannot be converted.

In addition to being an equivalence relation, CONVERT also implies a numeric measurement. As stated previously, there is a cost of making any conversion. Such cost may range from insignificant to cost prohibitive. For example, it might take an hour to take one set of 4-wheel drive tires off a tractor and another hour to put on a new set. If labor costs $20 per hour, then it would cost $40 to change from one set of 4-wheel tires to another. It is easy to imagine cases where the cost to make the conversion might not be the same for all pairs of options. Conversions that cannot be made at all can be thought of as having an infinite cost (written "INF"). The self conversion of an option, of course, has a cost of zero. A table of the conversion cost for the above 4-wheel tires would have zeros on the diagonal and 40's everywhere else. This would indicate that it takes 2 hours at $20/hour to change out any of the 4-wheel drive tires. Table 2400 of FIG. 24 illustrates the convert cost for the Transmission feature (cost to convert from the row option to the column option). Self conversion is free, all others are impossible or, at least, infinitely cost prohibitive.

The cost to convert from one configuration to another is assumed to be the sum of the costs to do all of the feature conversions. Although there may be occasions in which there are synergies in converting more than one option of a product at a time, the current assumption is sufficiently accurate for discussion purposes in explaining the present invention. If two configurations differ on any feature that cannot be converted, then that feature gets an infinite cost, which results in an infinite cost at the configuration level as well. If the cost for yCONVERTx is small, then y is close to x in terms of conversion cost.

ACCEPT Relation

The third primary relation defined by the present invention is called an "accept relation." The accept relation is about moving the customer instead of moving an option of the product. For example, suppose "a" and "b" are two options of some feature. A customer who wants "b" might be persuaded to take "a" instead. This would entail paying the price for "a" instead of "b." Such concept may be represented by the following syntax: "aACCEPTb" if a customer who wants "b" might be willing to accept, and pay for "a." ACCEPT is not a partial order since it does not satisfy uniqueness. For example, a customer might be willing to switch from cloth seats to leather seats, or vice versa, but that does not mean that cloth and leather are the same thing. The ACCEPT relation is not an equivalence relation either, since it does not satisfy commutativity. For example, a customer might be willing to accept an automatic transmission instead of a manual transmission, but not necessarily manual instead of automatic. So ACCEPT is an asymmetric relation. Like the CONVERT relation, the ACCEPT relation also comes with a numeric measure. If aACCEPTb is true, then there is some associated probability of acceptance, defined as "p". Thus, if aACCEPTb, then "p" can be interpreted as the probability that a customer will accept "a" instead of "b", or as the proportion of customers who would accept "a" instead of "b". This probability must be between 0 (never accept) and 1 (always accept).

Table 2500 of FIG. 25 illustrates the probabilities for the ACCEPT relation on the Transmission feature of the tractor. The number in a cell of this table 2500 is the probability that a customer who wants the column option would accept the row option. It should be noted that there is possible asymmetry between option. In other words, there may be a higher percentage of people willing to switch from option a to option b, but a lower percentage willing to switch the other way around. For example, as shown in table 2500, 40% of customers who want SST would be willing to switch to PRT (see cell 2502), but none of the customers who want PRT would switch to SST (see cell 2504).

As with the other relations, the ACCEPT relation can also be extended to whole configurations. For example, a customer who wants configuration x might be willing to accept configuration y as long as there is a non-zero probability of acceptance for each feature. Although there may be slight synergistic positive or negative impact on accepting one configuration despite an original desire for a different configuration, it is assumed (and sufficiently accurate for the present invention) that if a customer might be moved on each feature, then the customer might be moved on the whole configuration. Assuming that the probabilities are independent, then it is possible to compute the probability associated with accepting y instead of x as the product of the probabilities for each individual features. For example, if there is a 0.4 (40%) chance of moving a customer from SST to HST on the Transmission feature and a 0.5 (50%) chance of moving a customer from 2WD to 4WD on the Front Axle feature, then there is a 20% (0.4*0.5=0.2) chance of moving the customer on both features. The syntax "yACCEPTx" is used to indicate that configuration y might be accepted in place of configuration x.

If the probability of accepting configuration y instead of configuration x is close to one, then configuration y is "close to" configuration x in terms of customer acceptance. But configuration x is not necessarily close to configuration y. This is one illustration as to why physical distance" between product configurations in a multidimensional space is meaningless.

Using the above-defined relations, it is possible to define three neighborhoods of any valid configuration y in configuration space. Such neighborhoods may be described by the following three principles:

(1) UPGRADE(y) is the set of all valid configurations x that have y as an upgrade, i.e. yUPGRADEx is true.
(2) CONVERT(y) is the set of all valid configurations x that could be obtained from y by conversion, i.e. yCONVERTx is true, and the cost of conversion is less than infinity.
(3) ACCEPT(y) is the set of all valid configurations x that could be switched to y, i.e. yACCEPTx is true, and the probability of acceptance is greater than zero.

From these three relations on the configuration space, it is possible to define a comprehensive, fourth one, which is called "capture." The capture relation explains that configuration y can capture configuration x if y could be used to satisfy a customer who wants x, either by free upgrade, conversion of y to x, or by persuading the customer to switch from x to y. Thus, CAPTURE(y) may be used to define and describe all configurations x that belong to UPGRADE(y), CONVERT(y), or ACCEPT(y).

In order to complete the option relations for current tractor example, additional UPGRADE and ACCEPT tables 2600, 2700, 2800, 2900, 3000, 3100, 3200, and 3300 in FIGS. 26 through 33 are included herein. FIGS. 26 and 27 illustrate the UPGRADE relation for the PTO and Draft Links features, respectively. FIGS. 28 through 33 illustrate the ACCEPT probabilities for the Front Axle, ROPS, PTO, SCV, Draft Links, and Hitch features, respectively. Finally, it is assumed for the present tractor example, that only the tires can be CONVERT'ed and that any two types of tires can be switched for a cost of $40.

Optimization Models

As stated previously, a primary goal of the present invention is to answer fundamental questions about a configurable product. For example, how many configurations should be made, what configurations should they be, how many of each of these configurations should be made, and the like? The following optimization models provide solutions that, in turn, enable answers to the above questions to be obtained.

Fixed Number of Patterns

It will be helpful to construct a first model in which the number of configurations to build (denoted hereinafter by "r" or (r)) is given or is assumed. Later, the present invention will explain how this number (r) may be obtained or solved using different mathematical models.

The purpose of this first model is to identify the "best" product configurations to build assuming you can only build (r) number of configurations. This first model is built using three sets of configurations: V, C, and P. Configuration set V stands for the set of all "valid" configurations. Configuration set C stands for the set of all configurations for which there is customer demand. We will assume that C is a subset of V. Configuration set P stands for the set of configurations, which will be called "candidate patterns" or "candidate configurations." P can be any subset of V, and the process of determining P will be described hereinafter.

Figure 34:
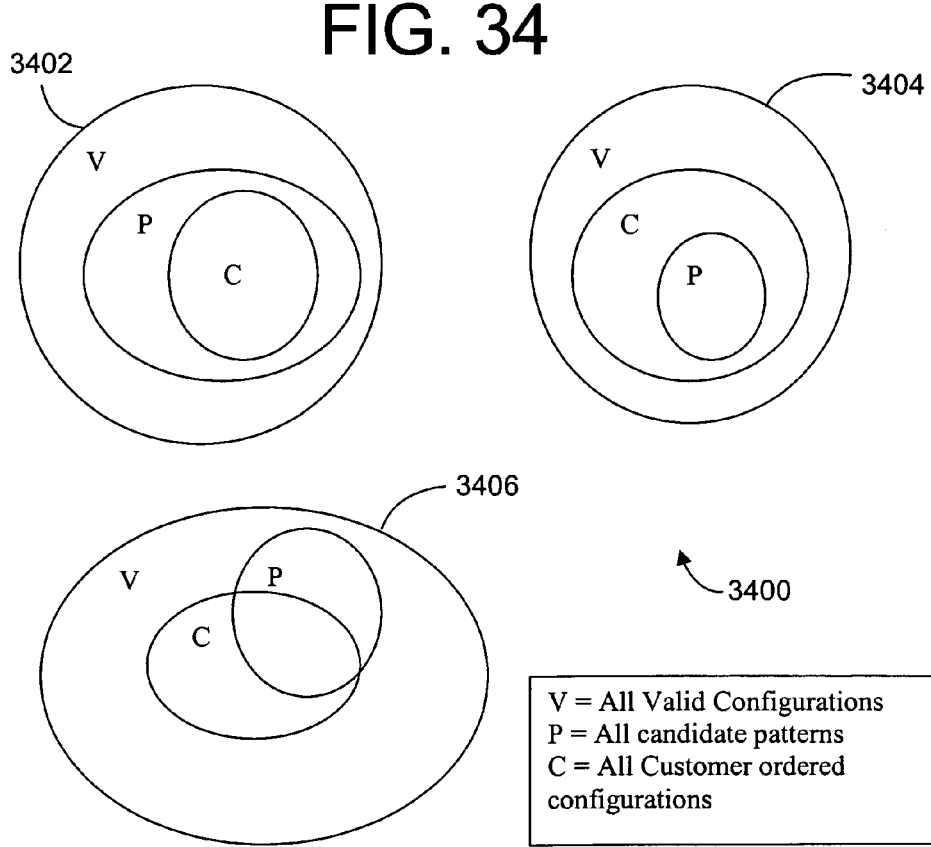
FIG. 34 is a Venn diagram showing the possible relationships between three sets of configurations: all "valid" configurations (V), all configurations for which there is customer demand (C), and all "candidate patterns" or "candidate configurations" (P) for use with the present invention.

Possible relationships among V, C, and P are illustrated graphically in the Venn Diagrams 3400 of FIG. 34. Diagram 3402 illustrates the scenario in which C is a subset of P. Diagram 3404 illustrates the opposite scenario in which P is a subset of C. Finally, diagram 3406 illustrates the scenario in which C and P intersect partially only. Although not shown, interesting special cases can exist in which every valid configuration (V) is a candidate pattern (P) (i.e., P=V) and in which every configuration with customer demand (C) is a candidate pattern (P) (i.e., P=C). In the tractor example we have been discussing, V contains 2832 configurations and C contains the 713 of those 2832 that have a customer demand of at least one tractor.

Thus, the purpose of the first model is to choose the (r) configurations to build from among the members of P. The problem is to find the (r) members of P that result in the maximum possible profit for the manufacturer or other company making/selling the given product. To do so, each configuration in C will be assigned to or associated with a single one of the (r) winning candidates in P. That means that customers who want a configuration in C will be given the one assigned to or associated with that configuration, but from P. The customer will be "satisfied" based on free upgrades, conversion, or acceptance.

Note that if P contains (p) number of configurations (i.e., (p) must be greater than or equal to the number of (r)), then there are pCr ways of choosing the "r" winners. As will be appreciated by those skilled in the art, the expression "pCr" is a binomial coefficient, which is equal to p!/r!(p−r)!. As will also be appreciated by those skilled in the art, the exclamation point "!" denotes the factorial function (e.g., 4!=1*2*3*4=24). Because we are already using the symbol C herein to represent customer-demanded configurations, we will use C' hereinafter when referring to binomial coefficient. Thus, the binomial coefficient, pC'r, is the number of ways that (r) objects can be chosen from among (p) objects. Patterns and configurations are really the same things, and in fact it is possible for P to equal C. As used hereinafter, "configurations" refers to "what the customer wants" and "patterns" refers to "what the manufacturer should/will build." The basic decision problem is assigning customer-ordered configurations C to company-produced patterns P.

In the previous section of the detailed description, the capture relation, CAPTURE(y), was defined to be the set of all valid configurations x that could be captured by configuration y, either by upgrade, conversion, or acceptance. Now, it will be helpful to think of "y" as being a candidate pattern in P and "x" as being a customer-ordered configuration in C. Viewing this information the other way around, it is possible to define for any customer configuration x in C:

COMPETE(x)=the set of all candidate patterns y such that x belongs to CAPTURE(y).

Thus, COMPETE(x) is the set of candidate patterns that are competing for x, and COMPETE(x) is a subset of P. The patterns compete for configurations in the sense that several patterns could capture configuration x, but only one will capture it.

To convert the above principles into mathematical models, the present invention uses the letter "i" to refer to the customer configurations in set C, and the letter "j" to refer to the candidate patterns in set P. The definitions of the various parameters and variables that go into the model are shown in detail in FIG. 35. "d(i)" stands for the demand (in number of units) for the product in configuration "i," where "i" is in customer-ordered configurations C; "convert(i,j)" stands for the cost of converting from pattern "j" to configuration "i," where "i" is in customer-ordered configurations C and where "j" is in COMPETE(i); "prob(i,j)" stands for the probability that a customer who wants configuration "i" will accept pattern "j," where "i" is in customer-ordered configurations C and where "j" is in COMPETE(i); "c(i,j)" stands for the cost per unit if configuration "i" is assigned to pattern "j," where "i" is in customer-ordered configurations C and where "j" is in COMPETE(i); and "r(i,j)" stands for the revenue per unit if configuration "i" is assigned to pattern "j," where "i" is in customer-ordered configurations C and where "j" is in COMPETE(i). The variables "x(i,j)" and "y(j)" are the decision variables that must be solved for using the mathematical model. "x(i,j)" will equal 1 if configuration "i" is assigned to pattern "j" in the solution, otherwise "x(i,j)" equals 0, where "i" is in customer-ordered configurations C and where "j" is in COMPETE(i). "y(j)" will equal 1 if pattern "j" is chosen as the winner in the solution, otherwise "y(j)" equals 0, where "j" is in company-produced patterns P. The parameters "d(i)," "convert(i,j)," and "prob(i,j)" are from the basic data for the product. The cost and revenue functions are computed as follows: since "j" is in "COMPETE(i)," which means that "i" is in "CAPTURE(j)," there are three possible cases. Recall that CAPTURE(j) was defined as the combination of three sets: UPGRADE(j), CONVERT(j), and ACCEPT(j).

Case 1. Configuration "i" is in "UPGRADE(j)." Then:
r(i,j)=revenue for configuration i,
c(i,j)=cost for pattern j.
This is true since the customer pays for configuration "i," but the customer is given pattern "j."

Case 2. Configuration "i" is in "CONVERT(j)," and not in "UPGRADE(j)." Then:
r(i,j)=revenue for configuration i,
c(i,j)=cost for pattern j+convert(i,j).
This is true since the customer pays for configuration "i," but the company has to pay to build pattern "j" and then pay to convert it to configuration "i."

Case 3. Configuration "i" is in "ACCEPT(j)," but is not in "CONVERT(j)" or "UPGRADE(j)." Then:
r(i,j)=(revenue for pattern j)*prob(i,j),
c(i,j)=(cost of pattern j)*prob(i,j).
This is true because the company pays to build pattern "j" and the customer pays for pattern "j," but there is only a probability "prob(i,j)" that the customer demand is actually captured. Some percentage of demand (1-prob(i,j)) is lost.

At this point it is necessary to introduce mathematical notation to express the optimization model in a precise and unambiguous way. The notation used is standard in the fields of Operations Research and Mathematical Programming. This notation can be found in any issue of the journals *Operations Research*, published by the Institute for Operations Research and Management Science (INFORMS), or *Math-*

*ematical Programming*, published by the Mathematical Programming Society (MPS), which are incorporated herein by reference in their entirety.

The first model (P1) 3600 is shown in FIG. 36. The objective function 3605 to be maximized is the total profit contribution, which is defined as total revenue minus total cost. Constraint Set 1 3610 says that each configuration "i" can be assigned to at most one of the eligible candidate patterns "j." It should be understood that if a customer configuration is not assigned to any candidate pattern, then the customers who wanted that configuration are lost. There are "m" of these constraints, where "m" is the number of customer configurations in C. Constraint Set 2 3620 says that configuration "i" cannot be assigned to pattern "j" unless pattern "j" has been selected as a winner (i.e. turned on, or set to one). If every configuration could be assigned to every pattern (COMPETE (i)=P for all i), then there would be a total of (m*p) of these constraints, but in practice there will be far fewer. Constraint Set 3 3630, which is just a single constraint, says that no more than "r" winning patterns can be chosen.

If there is no revenue, then maximizing the negative of the cost is equivalent to minimizing the cost. In such a case, each customer configuration in C must be assigned to exactly one pattern in COMPETE(i), since otherwise cost will be minimized (i.e., to zero) by losing all of the customers. Other non-economic objectives can also be used with model 3600, such as, for example, maximize the fraction of customer demand that can be captured by "r" patterns.

The process for solving this model will be discussed hereinafter. For the present discussion, it is merely important to understand what the model does and what it means. In particular, the x's and y's are the "decision variables" that must be solved for, and they are binary (0 or 1). The [r(i,j)-c(i,j)] coefficient is the profit contribution per unit of demand, from configuration "i" if it is assigned to pattern "j." Multiplying this contribution per unit by the number of units, d(i), gives the total profit contribution from customer configuration "1."

If pattern "j" is chosen as a winner, then y(j) is set to one, and this means any configuration "i" in CAPTURE(j) can be assigned to it. This is the meaning of Constraint Set 2 3620 in FIG. 36. A solution of the model 3600 is a setting of the x's and y's to zeros and ones in such a way that it that satisfies all of the constraints and gives the greatest possible total profit contribution.

To see one trivial solution of model 3600, assume that P=C and that r=p=m. In such a case, the optimal solution is y(j)=1 for every "j," and x(i,j)=1 if configuration "i" is the same as pattern "j," and 0 otherwise. That is, it is possible to maximize profit by assigning each configuration to itself, and giving each customer exactly what the customer wants. It should be noted that this assumes that revenue is greater than or equal to cost for every customer configuration.

In another example, the solution of model 3600 when r=1 can also be found easily. If r=1, then there can only be one pattern chosen. To find the solution, for each of the patterns "j" in P, assume that all of the customer configurations are captured in CAPTURE(j). By computing the total profit contribution for CAPTURE(j), the pattern with the highest profit is the unique winner.

When r is larger than 1 (i.e., there are a plurality of recommended patterns to build to satisfy demand and obtain the greatest profit), the patterns actually compete with each other and it becomes necessary to use special mathematical algorithms to find the optimal solution. For example, returning to our current tractor example, there are 713 customer configurations in C. If P=C is assumed and the five best patterns are desired (i.e., r=5), then there are 713C'5 alternative solutions, which is about 1.5 trillion. It get worse as "r" get bigger (up to the halfway point at 356), and then it gets easier again until r=713, since 713C' 1=713C'713=1. To see how fast the growth is: 713C'2=253,828 and 713C'3=60,157,236.

Variable Number of Patterns

In model (P1) 3600 of FIG. 36, the number of configurations to build, "r," is given. But this number can be determined by the model 3600 itself, if the "complexity cost" is known. As stated previously, "complexity cost" is defined as the incremental cost of producing one additional configuration. It is intended to include all of the relevant incremental costs from design, engineering, procurement, manufacturing, inventory, sales and marketing, and service. Complexity cost is in addition to the non-parts cost discussed earlier. "Non-parts cost" is specific to a particular configuration, while "complexity cost" depends on the number of configurations being produced. We now have three classes of costs: parts, non-parts, and complexity.

Complexity cost can be difficult to estimate, but it has a profound effect on the right number of configurations to produce. If the complexity cost is zero, then it is optimal to build every configuration for which there is demand. But as the complexity cost increases, the optimal number of configurations starts to drop, and will ultimately reach one.

If complexity cost is denoted by the parameter "G," then "r" can be converted from a parameter to a decision variable and the model 3600 re-expressed as model (P2) 3700, as shown in FIG. 37. In this model 3700, the number of winning patterns, "r," is a decision variable. It appears in the objective function 3705 with the complexity cost, "G." It also appears to the left of the equal sign in Constraint Set 3 3730, indicating that it is a variable rather than a fixed parameter. Since "r" is a decision variable, it can be increased as long as the increase in profit contribution is greater than the increase in the total complexity cost. Constraint Sets 2 and 3 3710, 3720 are also shown in FIG. 37.

The duality theory of linear programming reveals an intimate connection between model (P1) 3600 from FIG. 36 and model (P2) 3700 from FIG. 37, and offers some guidance on the estimation of the complexity cost, "G." For further support and explanation, please see Vanderbei, Robert J. [1997], Linear Programming: Foundations and Extensions, Kluwer Academic Publishers, Boston, Mass., Chap. 5, pp. 51-64, which is incorporated herein by reference in its entirety and submitted herewith. First, suppose that model (P1) 3600 has a natural integer solution, so that it can be solved by solving its linear programming relaxation. This means allowing the x's and y's to be between 0 and 1 as well as at 0 and 1. Then, consider Constraint Set 3 3630 of model (P1) 3600 of FIG. 36 that says there can be no more than "r" winning patterns. The complete (primal, dual) optimal solution of model (P1) 3600 includes a dual variable for this constraint, which shall be denoted by the Greek letter "rho." Duality theory explains that if G=rho and model (P2) 3700 is solved, then the optimal value for the variable "r" will be the same value that was fixed in model (P1) 3600. If model (P1) 3600 does not have a natural integer solution, a value for rho will still be obtained, but it will only be an estimate of the complexity cost that would recover the same "r" from model (P2) 3700.

Solving the Optimization Models

To be useful, the configuration optimization models (P1 and P2) must be solved. In other words, an algorithm that can find the settings of the "x" and "y" variables that satisfy all of the constraints and yield the maximum possible profit is needed. Or, more in the language of business, there needs to be a way to identify the set of patterns to build and decide which customer configurations each of these winning patterns should capture.

Optimization model (P1) 3600 and model (P2) 3700 are mixed-integer linear programs. As such, they can be solved by the well known branch-and-bound method, with bounds computed by solving linear programming relaxations. Such solutions are discussed, for example, in Nemhauser, and Wolsey [1988]. The resulting linear programs, however, grow very quickly as the number of product features increases, and they are hard to solve because of a property called "degeneracy." For our sample tractor problem with 9 features, if we start with P=V, then model (P1) 3600 has: 2832 y-variables and 120,426 x-variables. In more realistic examples with a greater number of features and options, there can easily be several million variables.

This suggests that the usual simplex method of solution for linear programs will not be effective. The present invention describes and explains hereinafter that it is possible to solve such large and complex problems successfully in a reasonable amount of time using the alternative Lagrangian relaxation method. For a more detailed discussion of the same, reference is made to Fisher, M. L. [1985], *An Applications Oriented Guide to Lagrangian Relaxation*, Interfaces, Vol. 15, No. 2, pp. 10-21, or Geoffrion, A. M. [1974], *Lagrangian Relation and Its Uses in Integer Programming*, Mathematical Programming, Study 2, pp. 82-114, which are incorporated herein by reference in their entirety and submitted herewith. To illustrate how this is done, reference is made back to the more general model (P2) 3700 from FIG. 37.

Fixed Set of Candidate Patterns, P

The linear programming relaxation of model (P2) 3700, which we will denote as (LP2) 3800 is illustrated in FIG. 38. LP2 3800, which includes Function 3805 and Constraints 3810, 3820, 3830, 3840, and 3850, allows the "x" and "y" variables to be fractional, between zero and one, rather than just binary. The Constraint Set 1 3810 says that each configuration "i" in C can be assigned to at most one pattern "j" in COMPETE(i).

To solve (LP2) 3800 by Lagrangian relaxation, these constraints are relaxed and any given configuration is permitted to be assigned to several patterns at once. Instead of a constraint for each configuration, a penalty term is put into the objective function 3805 to form a Lagrangian function 3900, as shown in FIG. 39. The Lagrangian function 3900 includes function 3905 and Constraints 3910, 3920, 3930, and 3940. The Greek letter "pi" variables are called the "Lagrange multipliers."

Simplifying and collecting terms, the Lagrangian function 3900 can be expressed as a simplified Lagrangian function 4000, as shown in FIG. 40. The simplified Lagrangian function 4000 includes function 4005 and Constraints 4010, 4020, 4030, and 4040.

Now, according to the results in Geoffrion [1974], solving (LP2) 3800 is equivalent to solving the Lagrangian dual problem 4100 shown in FIG. 41. In order to solve this dual problem 4100, two things are needed. First, an algorithm for evaluating the Lagrangian function, L, given the values of the Lagrange multipliers is needed. Second, an iterative algorithm for moving from one set of Lagrange multipliers to another in a way that will converge to the minimum of L is needed. Evaluating the Lagrangian function turns out to require only sorting. Converging to the minimum of L can be done with the well known subgradient optimization algorithm. For a more detailed discussion, please see Held, M. H., P. Wolfe, and H. D. Crowder [1974], *Validation of Subgradient Optimization*, Mathematical Programming, Vol. 6, No. 1, pp. 62-88, which is incorporated herein by reference in its entirety and submitted herewith.

Evaluating the Lagrangian function L is easy because each configuration can be assigned to several patterns if it is profitable to do so. This makes the inner maximization problem separate into a simple problem for each candidate pattern "j" in P. It should be noted that "max {a, 0}" is "a" if a>0, but is 0 if a<=0. For each "j" in P, the criterion number is computed, as shown in equation 4200 of FIG. 42.

Next, the winning patterns, for this choice of the Lagrange multipliers, are those with a criterion that is at least as large as the complexity cost, "G." The winning patterns for a given set of Langrange multipliers can be calculated by equation 4300 of FIG. 43. The current value of the Lagrangian is then determined by equation 4400, as shown in FIG. 44.

If one is trying to solve model (P1) 3600, with "r" fixed, instead of model (P2) 3700 with variable "r," then the only difference in applying the methodology of FIGS. 38-44 is that there will always be "r" winning patterns. These "r" winning patterns are the ones with the "r" biggest criteria. So for fixed "r," the patterns with the "r" biggest criteria (which requires sorting) are chosen, while for variable "r," all patterns with a criterion that is at least as big as the complexity cost, "G," are chosen.

Finally, the subgradient optimization algorithm 4500 of FIG. 45 is used to iterate on to the Lagrange multipliers and converge to the minimum of L. The iteration for k=0, 1, 2, . . . is specifically shown in FIG. 45. The step size parameters (Greek letter "lambda" in FIG. 45) are chosen in known manner using the methodology taught in Held, Wolfe, and Crowder [1974]. This iteration formula depends on the current primal solution 4600, which is illustrated in FIG. 46.

Each evaluation of the Lagrangian function involves finding values for the primal variables "x" and "y" (as explained above). So when the subgradient algorithm converges to the solution of the dual problem (D2) 4100 of FIG. 41, a primal solution is also determinable.

To summarize the preferred methodology described above, a solution of model (P2) 3700, or any other model, is obtained using a branch-and-bound algorithm that solves linear programs to compute bounds. Such linear programs are then solved by using Lagrangian relaxation rather than the simplex method. Lagrangian relaxation involves minimizing a Lagrangian dual function, which is done using the subgradient optimization method. All of this assumes that the set of candidate patterns, P, is given and fixed.

Automatic Pattern Generation

Now, based on an understanding of the methodology described above, it is possible to find a solution for P, when P is permitted to grow as needed. The optimization models of the present invention involve assigning customer-ordered configurations C to candidate patterns P. The set of candidate patterns P has been assumed to be given and fixed. The set P of candidate patterns could be taken as V, the complete set of valid configurations. If V is too large, then P could be taken as C, the subset of customer-ordered configurations. If C is still too large, then P could be just a subset of C. For example, it is possible to sort the configurations in C by their demand, and then, starting with the most popular, put the members of C into P until a given percentage, such as 25% of the total demand, has been collected. Regardless of how P is chosen, the methodologies discussed above have taught how to solve the optimization problem.

When one of the models, say (P2) 3700, is solved, both a primal and a dual solution is obtained. The primal solution consists of the "x" variables and "y" variables. The dual solution is a set of Lagrange multipliers (Greek letter "pi").

Now, the following new problem can be examined. Consider all of the possible candidate patterns that are not in the current model, namely, the set of configurations defined by V-P. The question that should be asked is whether there is any pattern, "k," that would be a winner if it were in the current problem? If so, then P should be expanded to include this new pattern "k," and then the expanded model should be re-solved.

This is a complex and daunting procedure, of which the algorithm for fixed P is just one step. This kind of complex and daunting procedure is known as "column generation" in the operations research literature. For a more detailed discussion regarding the same, please reference Lasdon, Leon S. [1970], *Optimization Theory for Large Systems*, The Macmilan Company, New York, N.Y., Chap. 4, pp. 207-242, reissued [2002] by Dover Publications, Inc. Mineola, N.Y., and Shapiro, Jeremy F. [1979], *Mathematical Programming: Structures and Algorithms*, John Wiley & Sons, Inc., New York, N.Y., Chap. 6, pp. 176-191, which are incorporated herein by reference in their entirety and submitted herewith. In the present invention, this will be called "pattern generation." A summary of the complete pattern generation algorithm 4700 is illustrated in FIG. 47.

The pattern generation algorithm (PGA) 4700 alternates between solving a "master problem" 4710 at Step 1, and a "sub-problem" 4720 at Step 2. The master problem 4710 has a fixed set of candidate patterns, and is solved by the methodology given earlier. The sub-problem 4720 involves searching for new patterns that would be winners, given the current Lagrange multipliers, if they were included. The PGA 4700 terminates when no such new pattern can be found. Thus, instead of starting with a large set of candidate patterns, it is possible to start with a small set and grow it as needed. An obvious improvement to this scheme is to generate many new patterns at Step 2, rather than just one.

Being able to solve large problems in a reasonable amount of computer time depends on being able to start with a small set of candidate patterns and grow it by adding only patterns that could be winners at each iteration of the PGA 4700. If one starts with a large set of patterns, then Step 1 will take a long time to solve, and most of the patterns will never be winners.

In summary, the overall strategy of the present invention is "pattern generation," which involves solving a sequence of problems, each of which has a fixed set of patterns. Each of these problems can be solved by branch-and-bound. Branch-and-bound involves solving linear programs to get bounds and primal solutions. These linear programs are solved using the method of Lagrangian relaxation.

Optimization for the Sample Tractor Configuration

For the sample tractor with 9 features, it has already been calculated that there are 34,560 possible configurations, but only 2832 valid configurations—based on the application of the rules in FIGS. 10 and 11. A simulation of 15,000 tractor orders using the take rates from FIGS. 18 and 19 resulted in 713 customer ordered configurations C with demands ranging from 948 tractors down to 1 tractor. The profit maximization model (P1) 3600 for r=16 patterns was solved. The choice of 16 patterns (r=16) is used for illustrative purposes only, with the intention of covering about 95% of the total demand. In practice, the model (P1) 3600 is preferably solved over a wide range of the number of patterns (r=?) before is making any recommendation. The cost of complexity is estimated from the resulting solutions, and model (P2) 3700 solved using this estimate. For purposes of the present example, however, only 16 pattern solution will be discussed in detail.

The solution consists of 16 winning patterns, and the assignment of the 713 customer configurations to the 16 patterns. In fact, 117 configurations are not assigned to any pattern, and so these orders are lost. These 117 lost configurations account for 398 tractors, about 2.6% of the total. The remaining 596 customer configurations are assigned to patterns, and these account for 14,602 tractors. Some of the assignments involve a probability of acceptance, and the expected number of tractors sold would be only 14,229. The capture of 14,229 units out of 15,000 is about 94.9%.

Table 4800 of FIG. 48 illustrates just one of the 16 winning patterns. This particular winning pattern captures twenty-six different customer configurations. As shown in table 4800, the winning pattern is identified as #151. This pattern is (Model_1, 4WD, SST, Folding, Mid_PTO, Dual_SCV, Flat Bar, None, 4WD_4510), which costs $9,770 in parts to build and has a list price of $14,822. For simplicity in discussing the present tractor example, no non-parts cost have been included or assumed.

Table 4900 of FIG. 49 illustrates a redacted list of the 26 customer configurations captured by pattern #151. Each of the 26 configurations is shown in a separate box in FIG. 49. Key 4905 explains the contents and arrangement of each box. For each of these configurations, the winning pattern (always 151), the demand, the revenue or list price, the total parts cost, capture attribute (accept, convert, or upgrade), accept (acceptance likelihood), and convert (cost of conversion) are listed along the top row of each box. The specifics of the configuration are then listed in the second row of each box.

Configuration 4910 indicates that such configuration has the "capture" attribute 4912 set to "convert." This means that pattern #151 would need to be converted to this configuration. The conversion involved is changing the tires from 4WD_4510 to 4WD_4500. The accept value 4914 is 1, meaning certain acceptance. Assuming that it is known from the cost data that 4WD 4510 tires cost $764.88 and 4WD 4500 tires cost $480.66, it is calculated that putting on a set of 4WD_4500 tires will cost $480.66 for the tires and $40 for the labor, for a total of $520.66. But $764.88 for the tires taken off is recoverable, for a net of −$244.22. This is shown as the convert value 4916.

Configuration 4920 indicates that such configuration has the capture attribute 4922 set to "upgrade." This means that a customer who wants this configuration will get some free upgrades, in this case a Mid_PTO. The convert value 4926 is zero, since there is no conversion and the upgrade is free, and the accept value 4924 is 1 for certain acceptance.

Configuration 4930 also has a capture attribute 4932 of "upgrade," but in this case the configuration is identical to the pattern. Thus, the acceptance value 4934 is 1 and the conversion cost 4936 is zero. Often, one of the customer configurations matches the winning pattern, but in some cases none of the captured configurations matches the pattern. For example, in this solution, winning pattern #774 (not shown) captures 39 customer configurations, but does not match any of them.

Configuration 4940 has the capture attribute 4942 set to "accept." Here, the customer would accept Folding ROPS instead of Fixed ROPS with a probability of 0.95. In other words, 95% of such customers would do so (see FIG. 29). Thus, the accept value 4944 is set to 0.95, and the convert value 4946 is zero.

Configuration 4950 also has the capture attribute 4952 set to "accept," but this is a much more complicated situation. Here, the customer has to accept Folding ROPS instead of Fixed ROPS, with probability 0.95 (see FIG. 29), Mid_PTO instead of Less_PTO, with a probability of 0.5 (see FIG. 30), and Dual_SCV instead of Triple_SCV, with a probability of 0.85 (FIG. 31). The product of these three probabilities is 0.95*0.5*0.85=0.40375. This is the accept value 4954, and the convert value 4956 is zero.

If the demand values for the 26 captured configurations are added, each weighted by the corresponding accept value, the total demand in number of units is 347.34375, as shown in cell 4804 of FIG. 48. Rounding to the nearest whole number, the tractor manufacturer/retailer would expect to sell 347 tractors that look like pattern #151.

If all sixteen optimal pattern solutions from the present tractor example were examined in detail, it would become apparent that the total profit contribution for all sixteen optimal pattern solution would be $118,415,604. This total profit contribution is calculated based on a total demand of 15,000 tractors, with an average profit contribution of $7894 per tractor order (not shown in any figure). The optimization system of the present invention assumed, conservatively, that the tractors were sold at a 10% discount off of the list price. It should be remembered that for this simple example, non-parts costs were ignored.

The 16 pattern solution found by the optimizer is the best solution from among 713C'16 possible 16 pattern solutions. The number 713C'16 is approximately 180 followed by 30 zeros: 180,000,000,000,000,000,000,000,000,000,000.

To see the benefit of solving the optimization model, suppose that the complexity cost, G, is $20,000 per additional configuration. Building 15,000 customer orders, in 713 different configurations, would result in a revenue of $19,166 per order and a parts cost of $10,616 per order. But the complexity cost per order would be $949 ($20,000*712/15,000), resulting in a profit contribution of $7601 per order. In contrast, using the 16 pattern solution recommended by the present optimization system, the tractor manufacturer could make only 14,229 tractors in 16 different configurations. The result would be a revenue of $18,178 per order and a cost of $10,284 per order, including both parts and conversion cost. (We compute the results in terms of all 15,000 orders to make the comparison fair.) But now the complexity cost per order is only $20 ($20,000*15/15,000), resulting in a profit contribution of $7874. Over the 15,000 orders, the manufacturer makes more than $4 million in additional profit.

The present 16 pattern solution example is more profitable than the usual 713 configuration solution as long as the complexity cost, G, is greater than $14,104. With a complexity cost of $20,000, as in the above example, the best solution actually has 55 patterns and a coverage of 99.9%. A 16 pattern solution was presented for exemplary purposes to show that if the complexity cost is high enough, then it is more profitable to lose as much as 5% of the demand.

Turning now to FIG. 50, a preferred methodology 5000 of the present invention is illustrated. First, raw product configuration data and related sales data is obtained (Step 5002). Raw product configuration data is typically obtained from the manufacturer of the product, although it can be obtained from other sources. Such data is typically in "raw" format, which means that it is merely a list or table of product configurations that identify features that are customer-ordered or configurable and options available for each feature. Such data may also contain extraneous information about the products such as "fixed" or non-configurable features, base components that are common to all products, and features that have but one option. As stated previously, such data is provided to the system of the present invention, which may be maintained and operated by the manufacturer/retailer of the products, by a third party service provider, by a consultant, or the like. Related sales data includes historical products sales figures, projections, demand, cost information (at component or parts level or both), and revenue information. Such related sales data may also includes cost figures associated with converting one product configuration to another, willingness of the manufacturer to offer free upgrades for some figures, and demand rates on a per configuration or per option basis. Obviously, the more accurate the data that is available for input into the system, the more accurate will be the optimization results obtained by the present invention.

Next, all possible product configurations are identified (Step 5004) and represented as a collection of features and options. Each feature represents a modifiable, variable, or customer-orderable feature that is above and beyond the base or core product offered. Each feature must have at least two options. The possible configurations are represented as an array or ordered set of n-dimensions, in which the number of dimensions corresponds to the number of features. An order for the n-number of features is decided upon and will be used consistently from then on.

The subset of "valid" configurations from the list of all possible configurations are then identified (Step 5006). Mix-and-match rules are used to identify non-valid feature or option combinations and such configurations are eliminated from the possible configurations to determine the subset of valid configurations.

Next, one or more relation structures are defined or identified (Step 5008) for the valid product configurations. Typically, such relations will include upgrade relations, convert or reconfiguration relations, and acceptance relations. As stated previously, an upgrade relation identifies what option upgrades the manufacturer is willing or able to offer to its customers for free. The trade-off is the ability for the manufacturer to manufacturer fewer product configurations but to capture greater demand for the fewer configurations offered. Although there is presumably some higher cost for providing the improvement, there is some cost savings by only manufacturing products with the higher grade option. As stated previously, a convert or reconfiguration relation identifies the cost of converting one configuration that has been manufactured to a different configuration requested by a customer. Conversion cost is typically borne by the manufacturer, but presumably, the cost of the configuration already includes such conversion cost and the customer is willing to pay for the configuration selected. Finally, the acceptance relation identifies the likelihood that a customer who wants one configuration will be willing to accept another configuration. Such likelihood is represented by a probability (0-100%) that the customer will accept the configuration that was not originally requested. In addition, it is assumed that the customer will pay the price of the other configuration—whether it is more or less than the configuration originally requested. Preferably, such cost difference is factored into the likelihood of the customer accepting the different configuration.

It is then possible to define (Step 5010) neighborhoods of similar configurations based on the upgrade relations, convert or reconfiguration relations, and acceptance relations. Such neighborhoods are defined as the ability of any given configuration to "capture," through upgrades, converts, and/or acceptances, other configurations.

Optimization mathematical models are constructed (Step 5012) to find the optimum product(s) (number and configuration) that the manufacturer should make. Such models will vary and the variables solved for will also vary depending upon the goals and objectives of the manufacturer. In some cases, the manufacturer may want to fix the number of different configurations, "r," to build and then determine which are the best "r" configurations. In other cases, such number will be variable. Also, in some situations, the manufacturer will want to optimize profit, minimize cost, or maximize demand coverage. All of the above may be solved for based on the methodologies of the present invention, which have been described in great detail previously.

Once the goals and objectives of the manufacturer are determined, the mathematical models may be solved to identify (Step 5014) the winning product patterns or configurations.

Such winning patterns or configurations are then presented (Step 5016) to the manufacturer with an identification of the "winning" configuration(s), the number that should be manufactured, the projected revenue and costs associated therewith, the configurations captured by each winning configuration, and the amount of customer demand satisfied thereby.

The above process may be repeated or re-run at any time if the product configurations offered by the manufacturer change, when any variables, such as cost, demand, price, and the like change, or if any of the objectives or goals of the manufacturer change—since any such modification will have repercussions on the results of the optimization determination. Thus, the present invention provides great flexibility for manufacturers, retailers, service providers and the like to examine many different scenarios and determine how best to conduct its business to meet the objectives and goals desired by the business.

In view of the foregoing detailed description of preferred embodiments of the present invention, it readily will be understood by those persons skilled in the art that the present invention is susceptible to broad utility and application. While various aspects of the invention have been described with reference to an exemplary plurality of tractor configurations, other aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

I claim:

1. A computerized system for identifying a globally optimal subset of product configurations from a plurality of possible product configurations associated with a product, wherein the globally optimal subset of product configurations identifies a limited number (r) of product configurations that should be offered to a company's customer base over a predefined future period of time to satisfy a desired objective of the company, wherein (r) is greater than or equal to 1 and wherein each product configuration includes a plurality of available features and wherein each feature includes a plurality of available options, comprising:

a processor;

a database for storing product configuration data and historical demand data associated with the plurality of possible product configurations, wherein each product configuration includes a specific combination of choices of options associated with the respective product; and a computer readable medium that is usable by the processor and is operatively coupled to the database, the medium having stored thereon a sequence of instructions that when executed by the processor causes the execution of the steps of:

receiving product configuration data from the database representative of the plurality of possible product configurations;

based on the received product configuration data, representing every product configuration in the plurality of possible product configurations as a point in a multi-dimensional product configuration space, wherein the product configuration space has a dimension for each of the plurality of product features;

eliminating all invalid product configurations in order to identify a plurality of valid product configurations as a smaller subset of the plurality of possible product configurations;

receiving historical demand data from the database for valid product configurations previously sold;

simultaneously optimizing all of the dimensions of the product configuration space using an optimization model, but without performing a complete enumeration of the valid product configurations, in order to identify a globally optimum subset of (r) valid product configurations from the plurality of valid product configurations based on the desired objective of the company and the received historical demand data;

outputting the globally optimal subset of valid product configurations that identifies the limited number (r) of product configurations that should be offered to the company's customer base over the predefined future period of time to satisfy the desired objective of the company.

2. The system of claim 1 wherein the processor causes the further execution of the step of associating a cost and a revenue to each valid product configuration.

3. The system of claim 2 wherein the cost associated with each valid product configuration is comprised of a plurality of per option costs.

4. The system of claim 2 wherein the cost associated with a respective valid product configuration is comprised of costs associated with a combination of options included in the respective valid product configuration.

5. The system of claim 1 wherein the desired objective of the company is to maximize the profit from the r number of product configurations offered to the company's customer base.

6. The system of claim 1 wherein the desired objective is to minimize the costs of manufacturing the r number of product configurations offered to the company's customer base.

7. The system of claim 1 wherein the desired objective is to identify the r number of product configurations offered to the company's customer base that will increase the company's market share.

8. The system of claim 1 wherein the r number of product configurations is a fixed value provided to the optimization model.

9. The system of claim 1 wherein the optimization model determines the optimum value of r for the r number of product configurations.

10. The system of claim 1 wherein each feature of the product is assigned to a respective dimension of the product configuration space and wherein each option of the feature is associated with a specific value on that respective dimension.

11. The system of claim 1 wherein the step of eliminating invalid product configurations further comprises the step of conducting fast enumeration on partial product configurations.

12. The system of claim 1 wherein the processor causes further execution of the step of defining configuration neighborhoods based on a relation structure, wherein the configuration neighborhoods identify at least one valid product configuration captured by another valid product configuration.

13. The system of claim 12 wherein the relation structure is an upgrade relation that identifies at least one feature having an option that is upgradeable for no additional cost to a customer of the product configuration having the upgrade option.

14. The system of claim 12 wherein the relation structure is a convert relation that identifies at least one feature having an option that is convertible to another option at a respective conversion cost.

15. The system of claim 12 wherein the relation structure is an acceptance relation that identifies at least one feature having an option that is acceptable to a consumer desiring a different option at a respective acceptance value.

16. The system of claim 15 wherein the acceptance value is a probability that the customer will accept the acceptance option instead of the different option.

17. The system of claim 12 wherein the relation structure is an acceptance relation that identifies a plurality of features, each feature having a respective option that is acceptable to a consumer desiring respective different options at a respective acceptance value, the acceptance value being the product of the probabilities that the customer will accept each respective different option.

18. The system of claim 12 wherein the relation structure identifies at least one valid product configuration that captures another valid product configuration through an upgrade, conversion, or acceptance of at least one option.

19. The system of claim 1 wherein the historical demand data comprises data based on previous sales of the product.

20. The system of claim 1 further comprising including forecasted future sales of the product as part of the historical demand data.

21. The system of claim 1 wherein the desired objective of the company is a function of: (i) the cost to manufacture each valid product configuration and (ii) the revenue value of each valid product configuration.

22. The system of claim 1 wherein the optimization model uses branch-and-bound algorithms to solve linear programs to compute bounds.

23. The system of claim 22 wherein the linear programs are then solved by using Lagrangian relaxation algorithms.

24. The system of claim 23 wherein the Lagrangian relaxation algorithms involve maximizing a Lagrangian dual function using a subgradient optimization model.

25. The system of claim 1 wherein the optimization model further comprises a pattern generation algorithm.

* * * * *